US008869016B2

(12) United States Patent
Barnes et al.

(10) Patent No.: US 8,869,016 B2
(45) Date of Patent: Oct. 21, 2014

(54) PAGE CREATION SYSTEM

(75) Inventors: Kevin Ray Barnes, Fletcher, NC (US);
Amit Chaudhary, Kathmandu (NP);
Subrat Basnet, Kathmandu (NP)

(73) Assignee: You Everywhere Now, LLC, San Diego, CA (US)

( * ) Notice: Subject to any disclaimer, the term of this patent is extended or adjusted under 35 U.S.C. 154(b) by 402 days.

(21) Appl. No.: 13/419,012

(22) Filed: Mar. 13, 2012

(65) Prior Publication Data

US 2013/0246896 A1    Sep. 19, 2013

(51) Int. Cl.
*G06F 17/22*    (2006.01)
(52) U.S. Cl.
USPC ............ 715/202; 715/201; 715/234; 715/763
(58) Field of Classification Search
USPC ......... 715/201, 202, 205, 224, 234, 255, 256, 715/700, 760, 763
See application file for complete search history.

(56) References Cited

U.S. PATENT DOCUMENTS

| | | | | |
|---|---|---|---|---|
| 7,475,109 B1 * | 1/2009 | Fletcher et al. | ............... | 709/204 |
| 8,688,788 B2 * | 4/2014 | Wilson | ........................... | 709/206 |
| 8,787,538 B2 * | 7/2014 | Koenigs | ..................... | 379/88.22 |
| 2009/0037541 A1 * | 2/2009 | Wilson | ........................... | 709/206 |
| 2010/0202597 A1 * | 8/2010 | Koenigs | ..................... | 379/88.01 |
| 2012/0233020 A1 * | 9/2012 | Eberstadt et al. | .......... | 705/26.41 |

OTHER PUBLICATIONS

Klym et al. "Building Social Services", IEEE, Jan. 2010, 5 pages.*
"SMS Autosponders", Feb 9, 2010, 2 pages.*
"PromaSoft AutoResponder Email Automation", Apr. 2003, 3 pages.*
iwipa, "Build a free website inside of facebook", http://www.facebook.com/iwipa?sk=app_191494420889273&app_data=p.-6, accessed on Mar. 13, 2012.

* cited by examiner

*Primary Examiner* — Maikhanh Nguyen
(74) *Attorney, Agent, or Firm* — DuBois, Bryant & Campbell LLP; William D. Wiese

(57) ABSTRACT

Various technologies and techniques are disclosed for creating web pages for third party web sites such as Facebook. A page creation system is disclosed for creating web pages that encourage visitors to like a particular page on a third party site. Integration details are received about a third party site. Upon selecting a particular page template, the template is displayed with incomplete sections of the page template for the user to fill in. Content is received from the user for incomplete sections to form a completed page content. A create page selection is received from the user. A blurred version of a web page is created from the completed page content. A normal version of the web page that is designed for display after the blurred version is also created. The blurred version and normal version of the web page are published to the third party site.

12 Claims, 26 Drawing Sheets

PAGE CREATION SYSTEM

BACKGROUND

Various social media sites such as Facebook® and MySpace allow users to interact with one another in various ways. Users can create one or more web pages within their social media account, and then allow other users to see those pages. These web pages are hosted within the social media site framework and often have additional elements to encourage social interaction than what a typical web page would have.

For example, if you create your own Facebook page, that web page will be displayed as a "Facebook Page Tab" along with a "Like" button that allows people to follow you on Facebook and let others know they like your page. Once someone selects the Like button to indicate they like your page, Facebook gives you the option of showing a different web page to that person (i.e. if you have selected an option to use a "reveal tab"). Others who have not yet liked your page will still see the first version of your page. And if you don't enable the reveal tab option where you can show two separate versions of your Facebook Page Tab, then the same web page will be displayed to users who have liked your page and to users who have not liked your page.

There are various ways to create a new page on one of these social media sites. For example, you can follow the instructions posted by Facebook and create one yourself. Or you can use a third party tool to help you create one of these pages. But the existing solutions require the user to have technical knowledge of how to program in HTML, Facebook Applications, or complex graphical knowledge. There exists a need for easier ways to allow non-technical users to create and manage web pages within these social media sites and other web sites that encourage social interaction.

SUMMARY

Various technologies and techniques are disclosed for creating web pages for third party web sites, such as Facebook. A page creation system is disclosed for creating web pages that encourage visitors to like a particular page on a third party web site. Integration details are received about a third party web site. Upon selecting a particular page template, the template is displayed with incomplete sections of the page template for the user to fill in. Content is received from the user for incomplete sections to form a completed page content. A create page selection is received from the user. A blurred version of a web page is created from the completed page content. A normal version of the web page that is designed for display after the blurred version is also created. The blurred version and normal version of the web page are published to the third party web site.

In another implementation, a page creation system is disclosed that includes an integration module, a page customization module, and a page generation module. The integration module is responsible for integrating the page creation system with a third party web site, such as Facebook. The page customization module enables a user to design at least one web page to submit to the third party web site. The page customization module has a graphical user interface that enables the user to select from multiple templates and then fill in content for incomplete sections of a selected one of the templates. The graphical user interface further enables the user to specify lead capture integration information that allows the web page to capture and submit leads to an autoresponder system. The page generation module, upon request from the user, creates the at least one web page based upon the selected template, the content, and lead capture integration information provided by the user. The page generation module then publishes the web page to the third party web site by using the integration module to connect with the third party web site. In another implementation, the page creation system allows a user to create two separate versions of the page: a blurred version and a normal version. The blurred version is designed to encourage users to like the page so that the normal version of the page will then be displayed.

In yet another implementation, a non-transitory machine-readable medium is disclosed that has instructions stored thereon for causing a page creation system to perform various actions. For example, the page integration system receives integration details regarding a third party web site from a user. A page template selection is also received from the user. Then, a page template is displayed to the user, with incomplete sections of the page template for the user to fill in. Content is received from the user to fill in at least a portion of the incomplete sections of the page template to form a completed page content. Lead capture integration information is received from the user. A create page selection is received from the user. An initial image is captured of at least a portion of the completed page content. At least a portion of the initial image is blurred to generate a blurred image. A blurred version of the web page is generated from the blurred image. A normal version of the web page to be displayed after the blurred version is also created. The normal version of the web page is created with at least a portion of the lead capture integration information so that leads submitted through the normal version of the web page can be sent to an autoresponder system. The blurred version and the normal version of the web page are published to the third party web site.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 5 is a simulated screen for one implementation that illustrates selecting an existing web page from a third party web site to create or update the page content for.

DETAILED DESCRIPTION

The technologies and techniques herein may be described in the general context as an application that creates web pages, but the technologies and techniques also serve other purposes in addition to these. In one implementation, one or more of the techniques described herein can be implemented as features within any other type of program or service that creates web pages. In another implementation, one or more of the techniques described herein are implemented as features within other applications that deal with creating pages for social media sites, such as Facebook pages.

A page creation system is described herein that allows users to create web pages for one or more third party web sites, such as Facebook pages. A graphical user interface allows a user to create or update the content for a particular page without having any programming knowledge. The user can select a page template to start with, and then fill in various incomplete sections in the page template with the desired content. In one implementation, the user can add code provided from an autoresponder system within the user interface while designing the page. The user might use such an option if user wants the web page to capture leads by allowing visitors to provide their contact information to receive more information or for a free gift.

In one implementation, the user can also select an option to use a reveal tab that shows two different versions of a web page to visitors who have liked the page on the third party site versus those who have not liked the page on the third party site. When such reveal tab option is set to yes, the page creation system generates a blurred version of the web page and a normal version of the web page, and then submits both versions of the web page to the third party site when requested. The blurred version of the web page has at least some of the page content blurred out to encourage visitors on the third party site to "like" the page in order for the normal version of the web page to be displayed (to show what was blurred out).

The term "web page" and "page" as used herein is meant to include a web page that can be displayed within the framework of another web site (such as Facebook or MySpace) or displayed in a standalone fashion on a web site that encourages interactions or feedback from visitors. The term "blurred version of a web page" as used herein is meant to include a web page or portion of a web page that is displayed with at least some of the content being blurry, and not totally legible. The term "normal version of a web page" is meant to include a web page or portion of a web page that is displayed in a normal fashion (and without any of the content being blurry).

Figure 1:
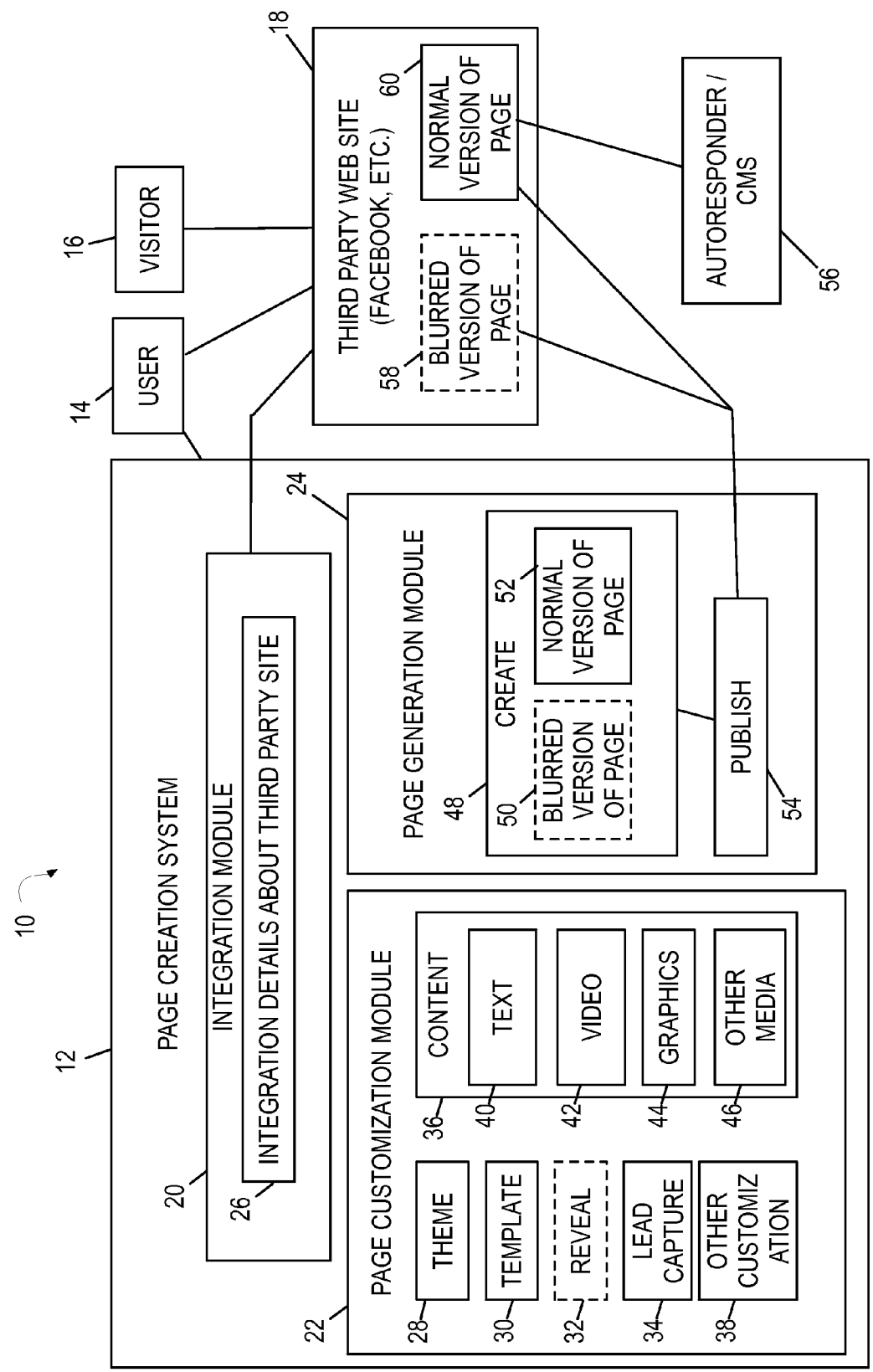
FIG. 1 is a diagrammatic view of a page creation system of one implementation.

FIG. 1 is a diagrammatic view of a system 10 of one implementation. System 10 includes page creation system 12, a third party web site 18, and optionally an autoresponder/CMS system 56. A user 14 can use page creation system 12 to create and/or update pages that appear on third party web site(s) 18, such as pages that are owned by user 14 on third party web site(s) 18. An example of such a page could include a Facebook page that appears at a specific URL on Facebook.com, such as www.Facebook.com/UserPageNameGoesHere. In other implementations, other third party sites could be used, such as MySpace, other social media sites, or other third party sites that encourage visitors 16 to like and/or interact with one or more pages on the site.

Page creation system 12 includes an integration module 20, a page customization module 22, and a page generation module 24. Integration module 20 is responsible for integrating the page creation system with a third party web site, such as Facebook. Integration module 20 receives integration details about the third party site(s) 18, such as from the user or programmatically. More details about integration module 20 are provided in FIGS. 2-5.

Page customization module 22 enables a user to design at least one web page to submit to third party web site(s) 18. Page customization module 22 has a graphical user interface that enables the user to specify various options to be used for creating the page, such as theme 28, page template 30, reveal option 32, lead capture integration information 34, content for the page 36, and other customization details 38. Content for the page can include text 40, video 42, graphics 44, and/or other media 46. In one implementation, the user uses page template 30 to fill in the content for incomplete sections of a selected one of the page templates 30. The graphical user interface further enables the user to specify lead capture integration information 34 that allows the web page (e.g. the normal version of the web page) to capture and submit leads to autoresponder system 56. A few non-limiting examples of autoresponder systems include Instant Customer, InfusionSoft, aWeber, and Office Autopilot. More details about page customization module are provided in FIGS. 2-3, and FIGS. 6-21.

Page generation module 24 has a create module 48 and a publish module 54. Upon request from the user, create module 48 of page generation module 24 creates the at least one web page based upon the options provided and/or selected by the user in the page customization module 22. Publish module 54 of page generation module 24 then publishes the web page(s) to the third party web site(s) 18 by using the integration module 20 to connect with the third party web site(s) 18.

In one implementation, page generation module 24 creates two separate versions of the page: a blurred version 50 and a normal version 52. The blurred version, when used, is designed to encourage users to like the page so that the normal version of the page will then be displayed. In one implementation, the reveal option 32 is what determines whether two versions of the web page are created (the blurred version 50 and normal version 52), or just one (e.g. just the normal version 52). In other implementations, the reveal option 32 may not be available or enabled by the user, and just a normal version 52 of the page is created. Whatever version(s) of the web page are created can then be published to the third party web site(s) 18 by the publish module 54. Once published by the publish module 54, the pages appear on the third party web site (such as blurred version of the page 58, and normal version of the page 60). More details about page generation module are provided in FIGS. 2-3, FIG. 17, and FIGS. 20-23.

Figure 2A:
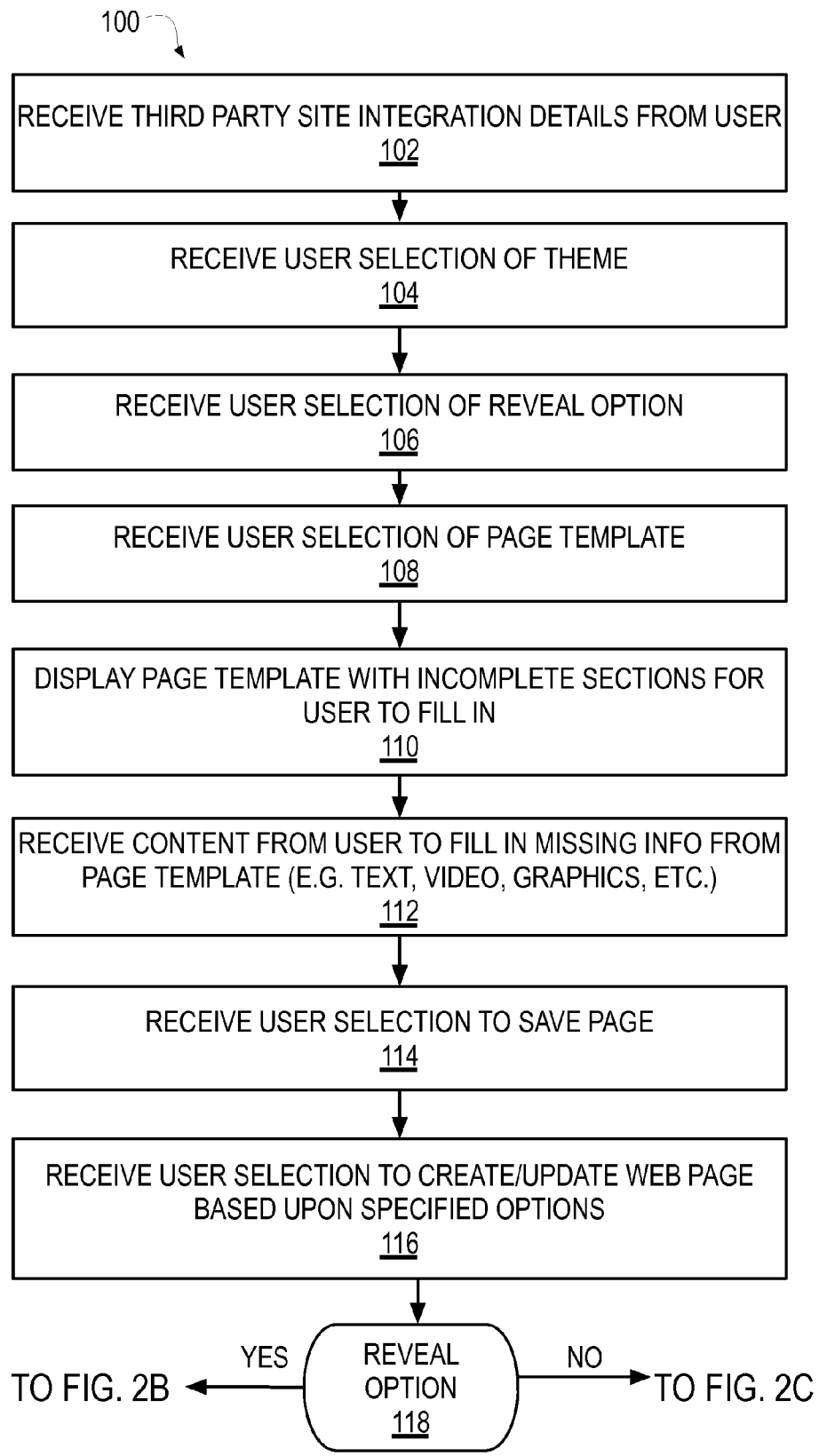
FIG. 2A-2C is a process flow diagram for one implementation illustrating the stages involved in creating a web page and publishing it to a third party web site.
Figure 2B:
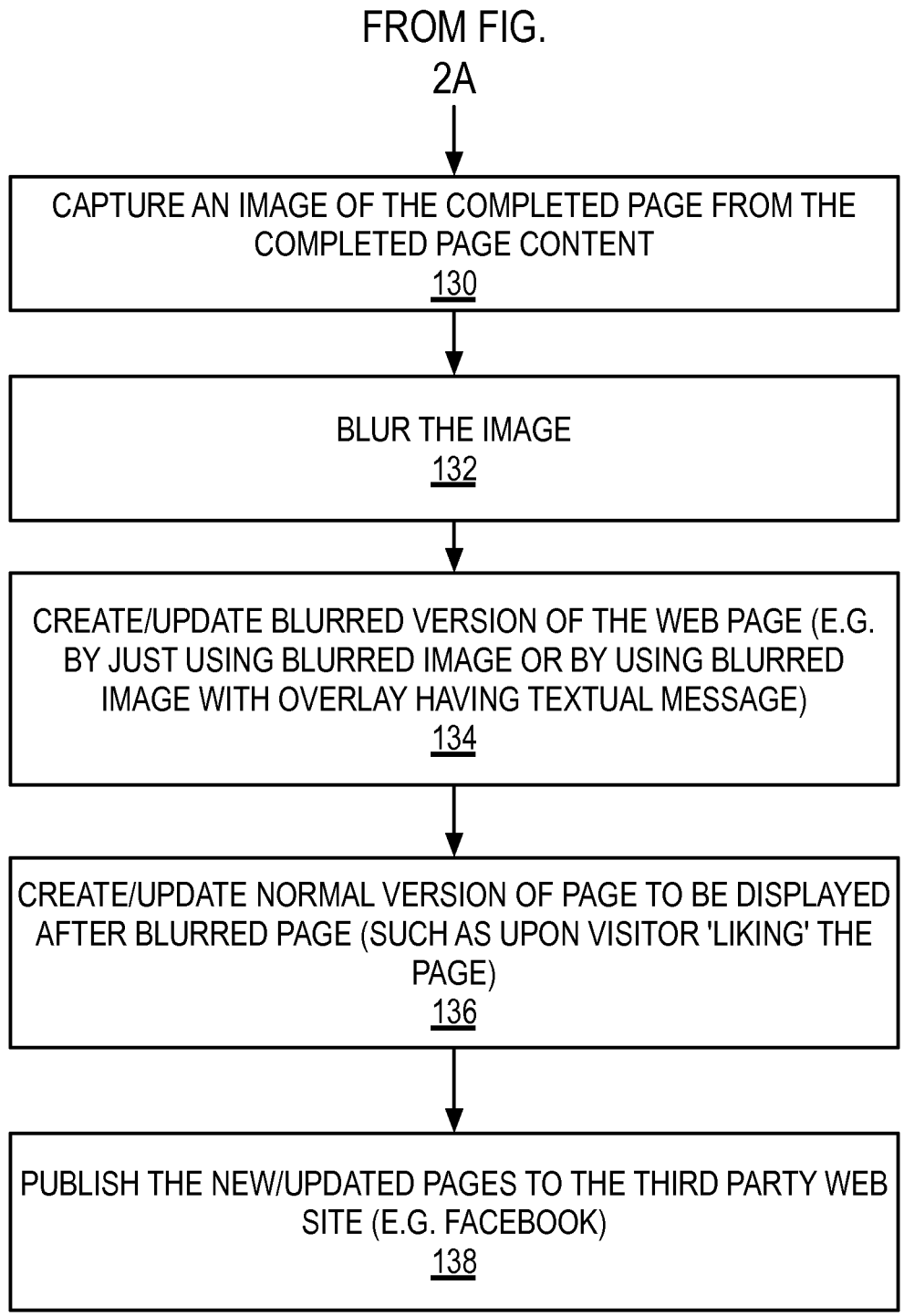
Figure 2C:
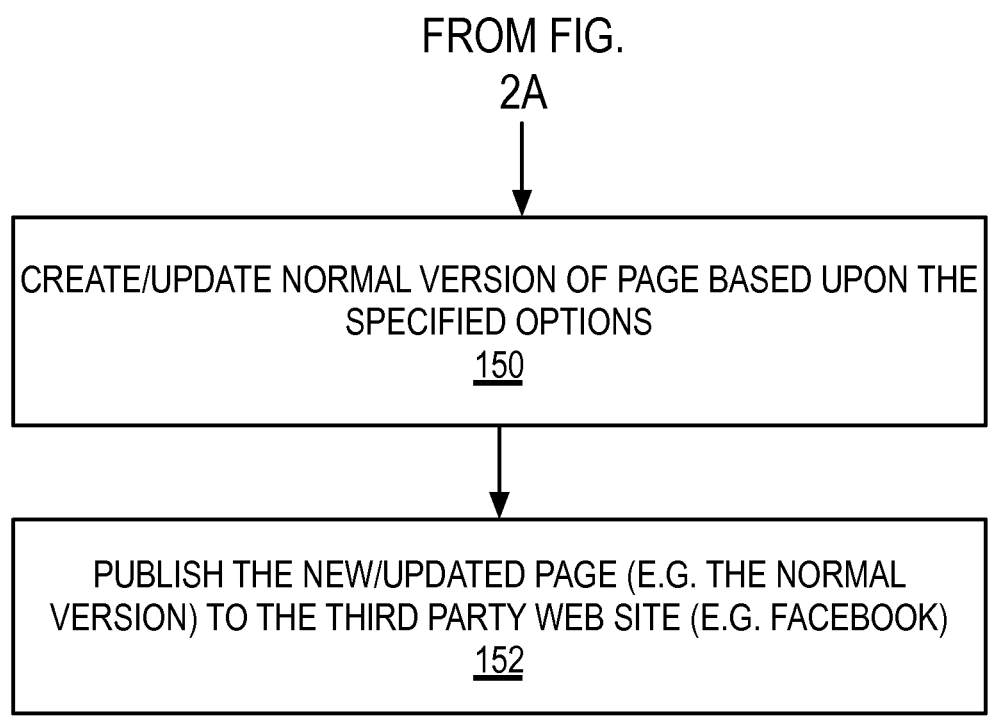
Figure 3:
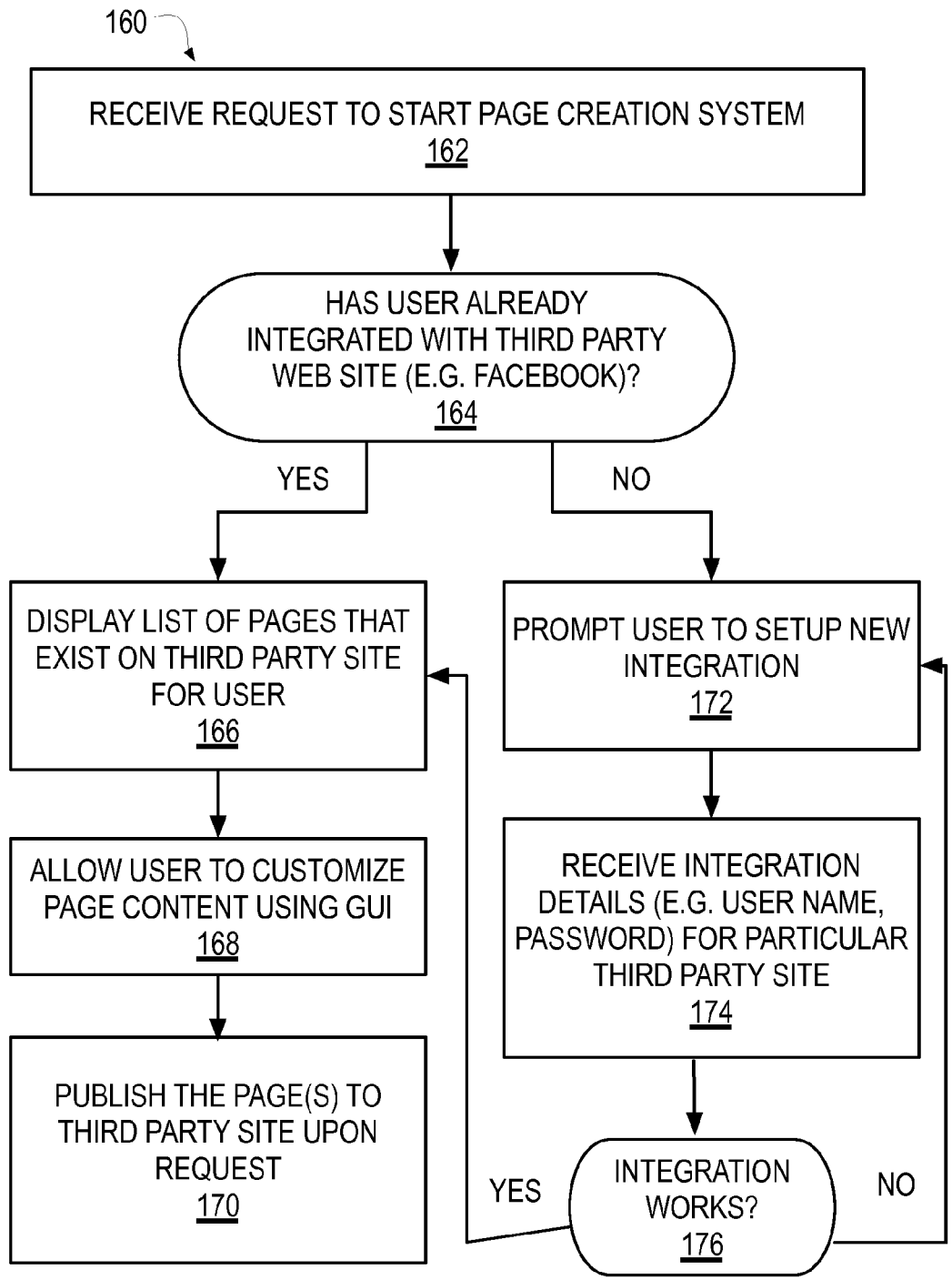
FIG. 3 is a process flow diagram for one implementation illustrating the stages involved in integrating with a third party web site.

Turning now to FIGS. 2-3, the stages for implementing one or more implementations of system 10 are described in further detail. In some implementations, the processes of FIG. 2-3 are at least partially implemented in the operating logic of computing device 500 (of FIG. 24).

FIG. 2A-2C is a process flow diagram 100 for one implementation illustrating the stages involved in creating a web page and publishing it to a third party web site. Third party site integration details are received from a user of page creation system 12 (stage 102). A selection is received from the user for a theme (stage 104). A selection is received from the user for a reveal option (stage 106). A selection is received from the user for a page template (stage 108). The page template is displayed to the user with incomplete sections for the user to fill in (stage 110). Content is received from the user to fill in the missing information from the page template, such as text, video, graphics, etc. (stage 112). A selection is received from the user to save the page (stage 114). A selection is received from the user to create and/or update the web page based upon the specified options (stage 116). If the reveal option (decision point 118) was selected as "YES" (either by the user or programmatically), then the process continues with FIG. 2B.

When the reveal option is selected as "YES" (decision point 118), an image is captured of the completed page from the completed page content (stage 130). In one implementation, the image is captured by taking a programmatic picture of what the page looks like after the user filled in the template with the desired content. The image is then blurred (stage 132), such as by programmatically applying a blur effect to the image. A blurred version of the web page is then created/updated, such as by just using the blurred image, or by using the blurred image with an overlay that has a textual message (stage 134). The normal version of the web page is then created/updated (stage 136). The normal version can be displayed in multiple scenarios, such as after a visitor on the third party site selects an option to "like" the blurred version of the page, if the reveal tab option is not being used, or if the reveal tab option is not an available option. The new/updated pages are then published to the third party web site, such as Facebook (stage 138).

If the reveal option (decision point 118) was selected as "NO" (either by the user or programmatically or because a reveal option was not available), then the process continues with FIG. 2C. The normal version of the web page is created based upon the specified options (stage 150). The new/updated page (e.g. the normal version) is then published to the third party web site, such as Facebook (stage 152).

FIG. 3 is a process flow diagram 160 for one implementation illustrating the stages involved in integrating with a third party web site. The integration process described in FIG. 3 is just one of various ways that such integration could take place. Numerous types of integration are possible as would occur to someone in the computer software art. A request is received to start page creation system 12 (stage 162). If the user has already integrated with the third party web site such as Facebook (decision point 164), then a list of pages are displayed that exist on the third party site for the user's account, when applicable (stage 166). The user can then customize the content that appears on the existing pages (when applicable) using the graphical user interface of page customization module 22 (stage 168), and can publish the page(s) to the third party site (stage 170).

If the user has not already integrated with the third party site (decision point 164), then the user is prompted to setup a new integration (stage 172). The integration details are received from the user (such as user name and password) for the particular third party site (stage 174). In one implementation, the user is redirected to the third party web site to log in and grant permission within the third party web site to allow page creation system 12 to access the account on the user's behalf. In another implementation, the user provides the login or other integration details directly within page creation system 12. In yet another implementation, the integration details may not need a user name or password, but may instead be a unique URL or other type of identifier that allows page creation system to post the web page(s) to the third party system as desired by the user.

Once the integration details are provided by the user (stage 174), page creation system 12 determines whether the integration works correctly. If the integration was successful (decision point 176), then the pages that exist on the third party site for the user can be displayed (stage 166), when applicable. The user can then customize the content that appears on the existing pages (when applicable) using the graphical user interface of page customization module 22 (stage 168), and can publish the page(s) to the third party site (stage 170). If the integration was not successful (decision point 176), then the user is again prompted to setup the integration (stage 172).

Turning now to FIGS. 4-23, simulated screens are shown to illustrate a user interface that that shows some non-limiting examples of how system 10 could be implemented. These screens can be displayed to users on output device(s) 511 (of FIG. 24). Furthermore, these screens can receive input from users from input device(s) 512 (of FIG. 24).

Figure 4:
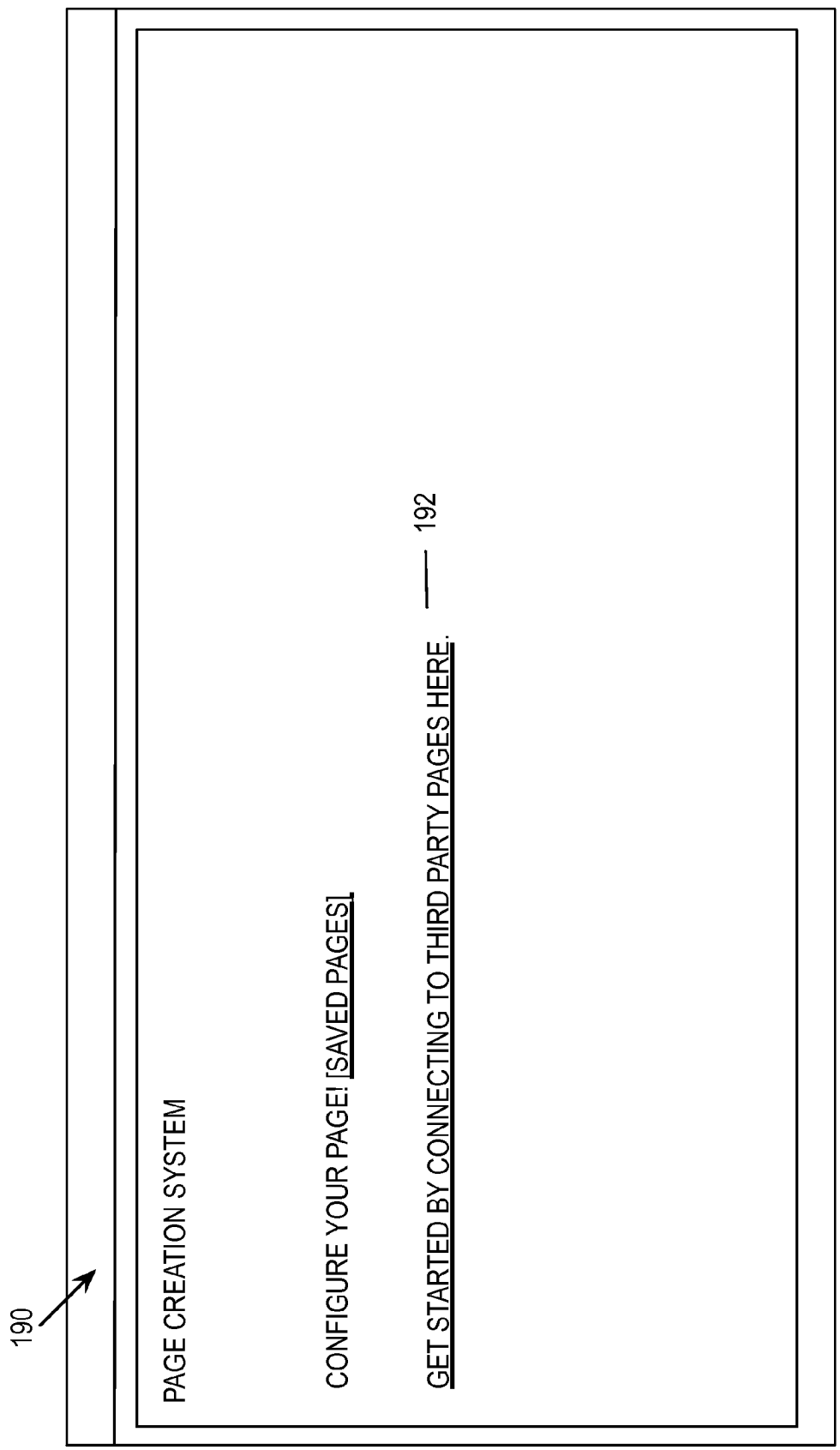
FIG. 4 is a simulated screen for one implementation that illustrates an option for integrating with a third party web site.

FIG. 4 is a simulated screen 190 for one implementation that illustrates an option 192 for integrating with a third party web site. In one implementation, when option 192 is selected, the user is re-directed to a login page of a third party web site (such as Facebook), so the user can log in to that account and grant page creation system 12 permission to access the user's account in the future (such as for updating the user's pages on that third party site). In another implementation, when option 192 is selected, the user is prompted to provide a user name and password for the user's third party account, so that page creation system 12 can log in on the user's behalf. In other implementations, the integration may not need a user name and password, and the user may only have to specify one or more URL's for posting the user's page(s) to the third party site.

Figure 5:
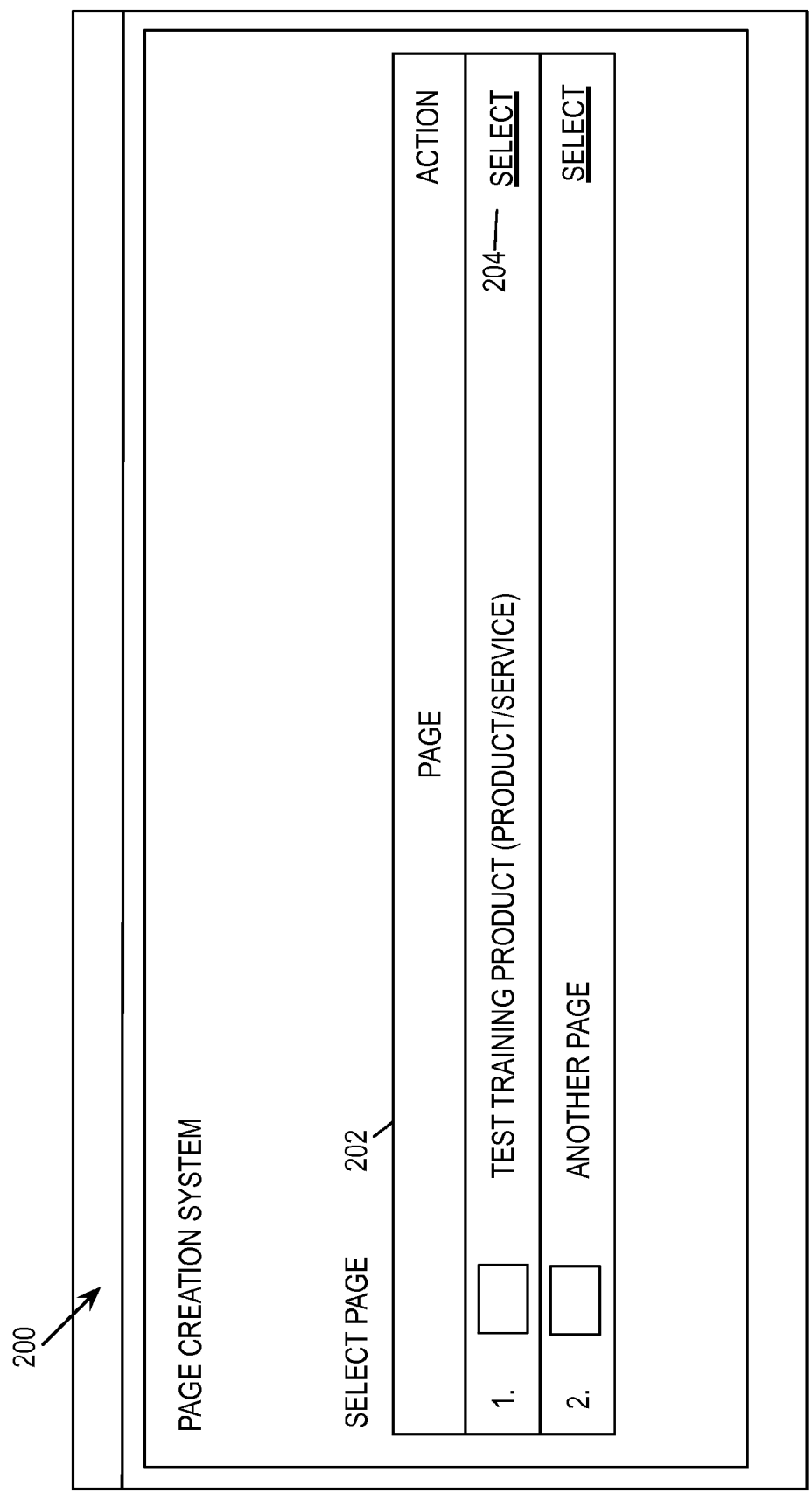

FIG. 5 is a simulated screen 200 for one implementation that illustrates selecting an existing web page 202 from a third party web site to create or update the page content for. To select a particular web page that is available for editing on the third party web site, a select option 204 can be selected. As one non-limiting example, page creation system 12 can use integration details provided in FIG. 4 to connect to the third party web site (such as through an API), and then retrieve the list of pages that already exist in that user's account on the third party site (such as Facebook). In another implementation, page creation system 12 may not display a list of current pages on the third party site, and alternatively or additionally may allow the user to create a totally new page from scratch for that third party site.

Figure 6:
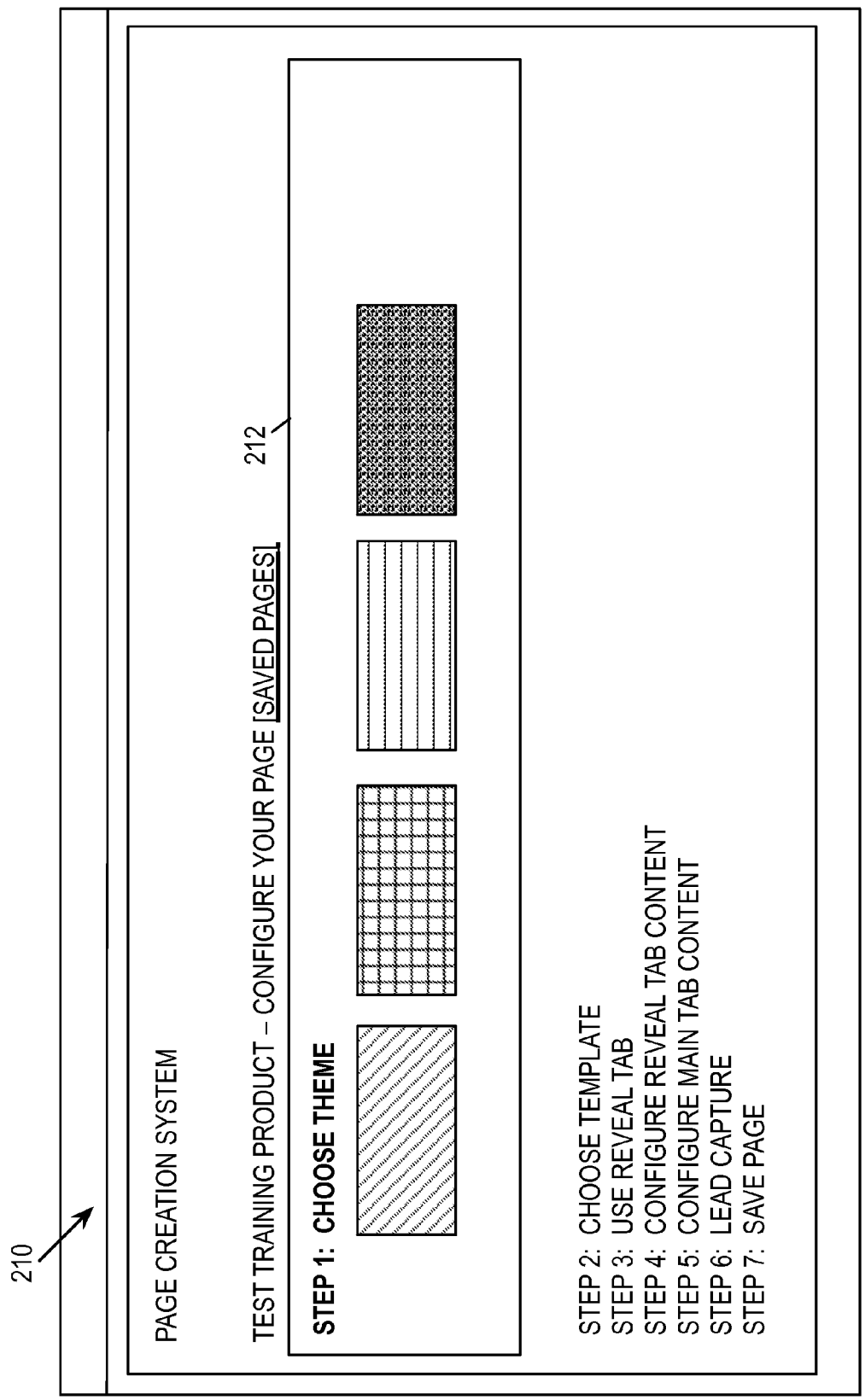
FIG. 6 is a simulated screen for one implementation that illustrates selecting a theme for the web page.

FIG. 6 is a simulated screen 210 for one implementation that illustrates selecting a theme 212 for the web page. Theme 212 can include a color scheme, a background color, and/or various other details regarding how the page will look.

Figure 7:
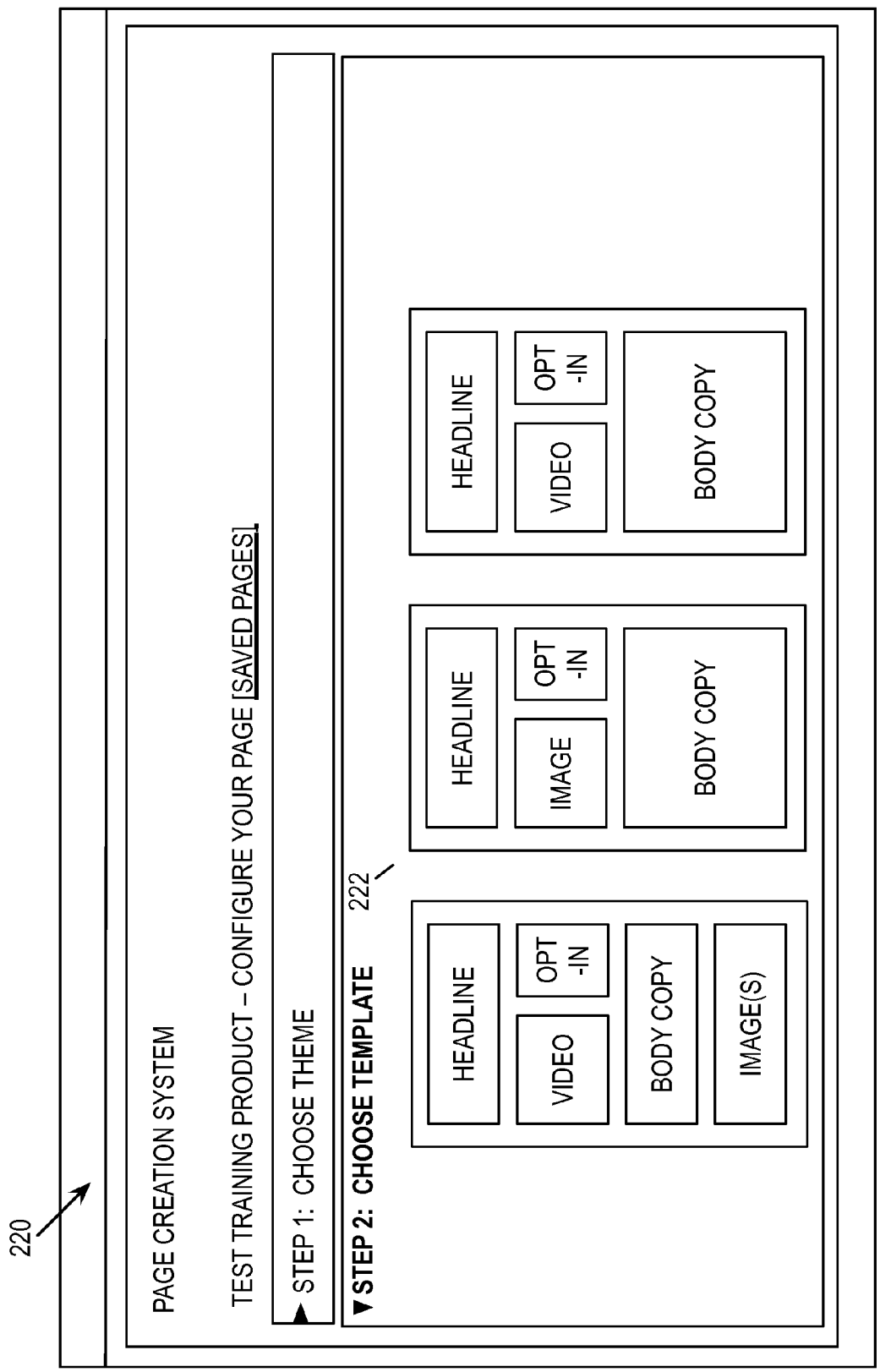
FIG. 7 is a simulated screen for one implementation that illustrates selecting a page template to use for creating the web page.

FIG. 7 is a simulated screen 220 for one implementation that illustrates selecting a page template 222 to use for creating the web page. In the examples shown, there are various combinations of headline, video, opt-in form fields, body copy, and images displayed. Numerous other types of page templates can be used in other implementations, including those that omit some of these elements. Some templates, for example, may include one or more videos, for example, while others may not include videos at all.

Figure 8:
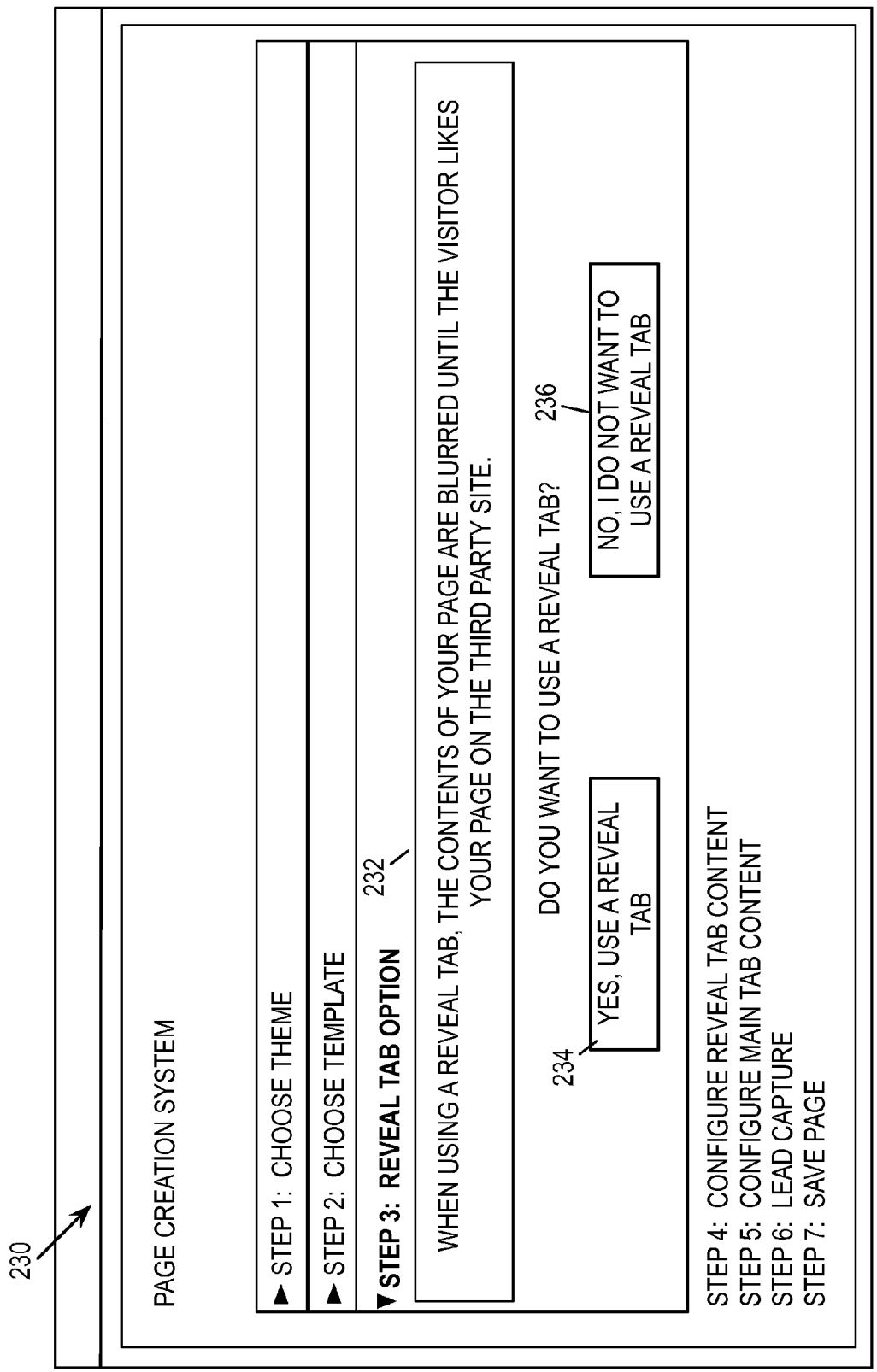
FIG. 8 is a simulated screen for one implementation that illustrates specifying whether to use a reveal tab for the web page where two web pages would be created instead of one.

FIG. 8 is a simulated screen 230 for one implementation that illustrates specifying whether to use a reveal tab 232 for the web page where two web pages would be created instead of one. When the reveal tab option is set to "yes" 234, then two different versions of the web page are created (e.g. a blurred version and a normal version). When the reveal tab option is set to "no" 236, only a normal version of the web page is created. In other implementations, a reveal tab option can be automatic, where two different versions of the page get created automatically, without needing the user to select an option to indicate their preferences. And in further implementations, the reveal tab option may be omitted altogether.

Figure 9:
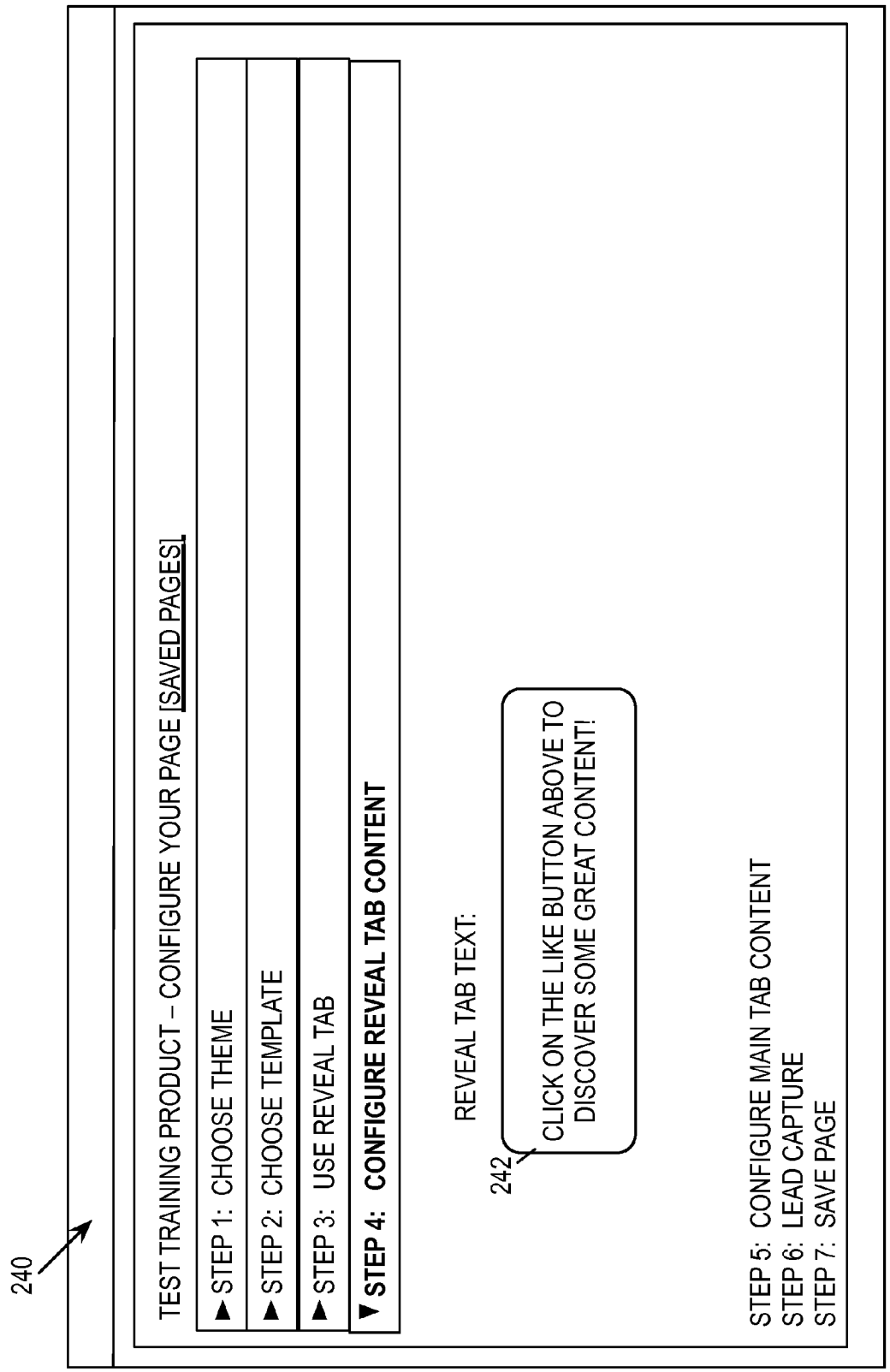
FIG. 9 is a simulated screen for one implementation that illustrates configuring content to be displayed on the blurred version of the web page, when the reveal tab option is being used.

FIG. 9 is a simulated screen 240 for one implementation that illustrates configuring content to be displayed on the blurred version of the web page, when the reveal tab is being used (either because the user selected the option, or because it is being created by default). In the example shown, the user is able to specify wording 242 that gets overlaid (in a legible format) on top of the blurred image. As one non-limiting example, the wording can encourage the visitor of the third party web site to click the "Like" button to like the page so that the normal (and non-blurry) version of the page gets displayed. In other implementations, there may not be any legible wording overlaid on top of the blurry image, and the blurred version of the page may be entirely blurry.

Figure 10:
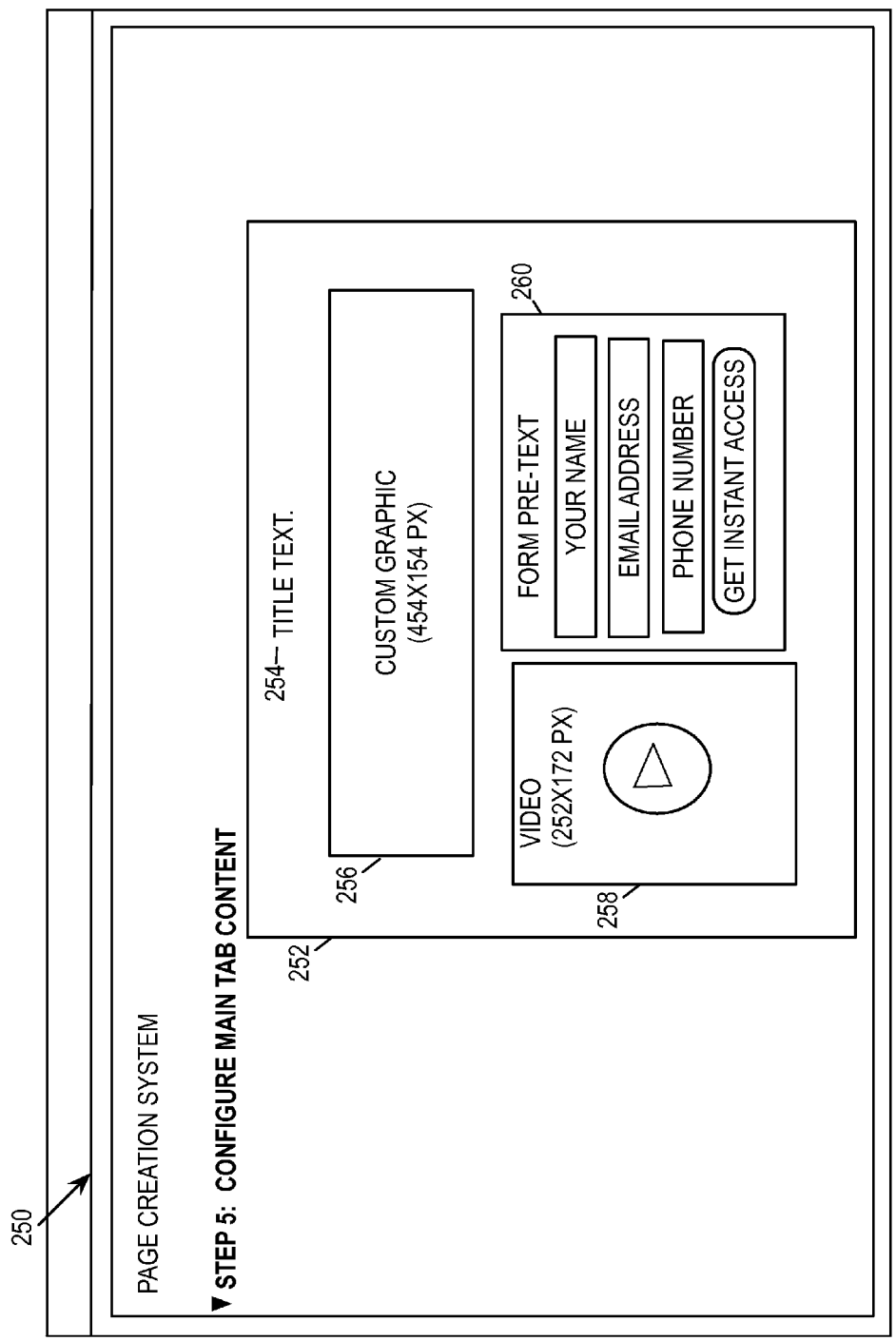
FIG. 10 is a simulated screen for one implementation that illustrates configuring content for the web page based upon the selected page template.

FIG. 10 is a simulated screen 250 for one implementation that illustrates configuring content for the web page based upon the selected page template. In the example shown, the selected page template 252 has incomplete information that needs to be filled in by the user, such as a title text section 254, custom graphic section 256, video section 258, and an opt-in section 260. The custom graphic section 256 and video section 258 shown in this example include dimensions for what acceptable sizes are for that section. Such dimensions are optional and may not be displayed in other implementations.

Figure 11:
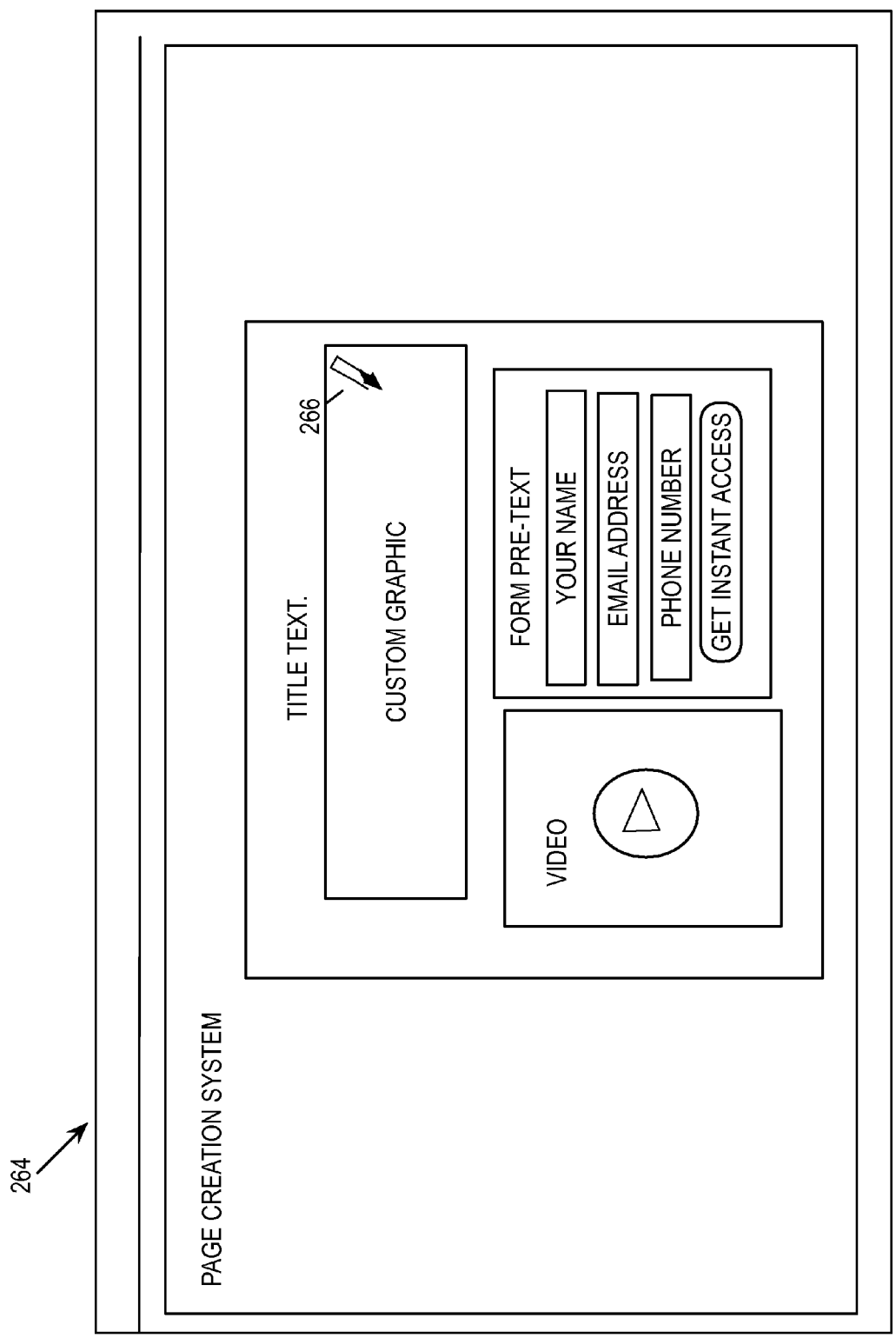
FIG. 11 is a simulated screen for one implementation that illustrates adding/editing a custom graphic for the selected page template.
Figure 12:
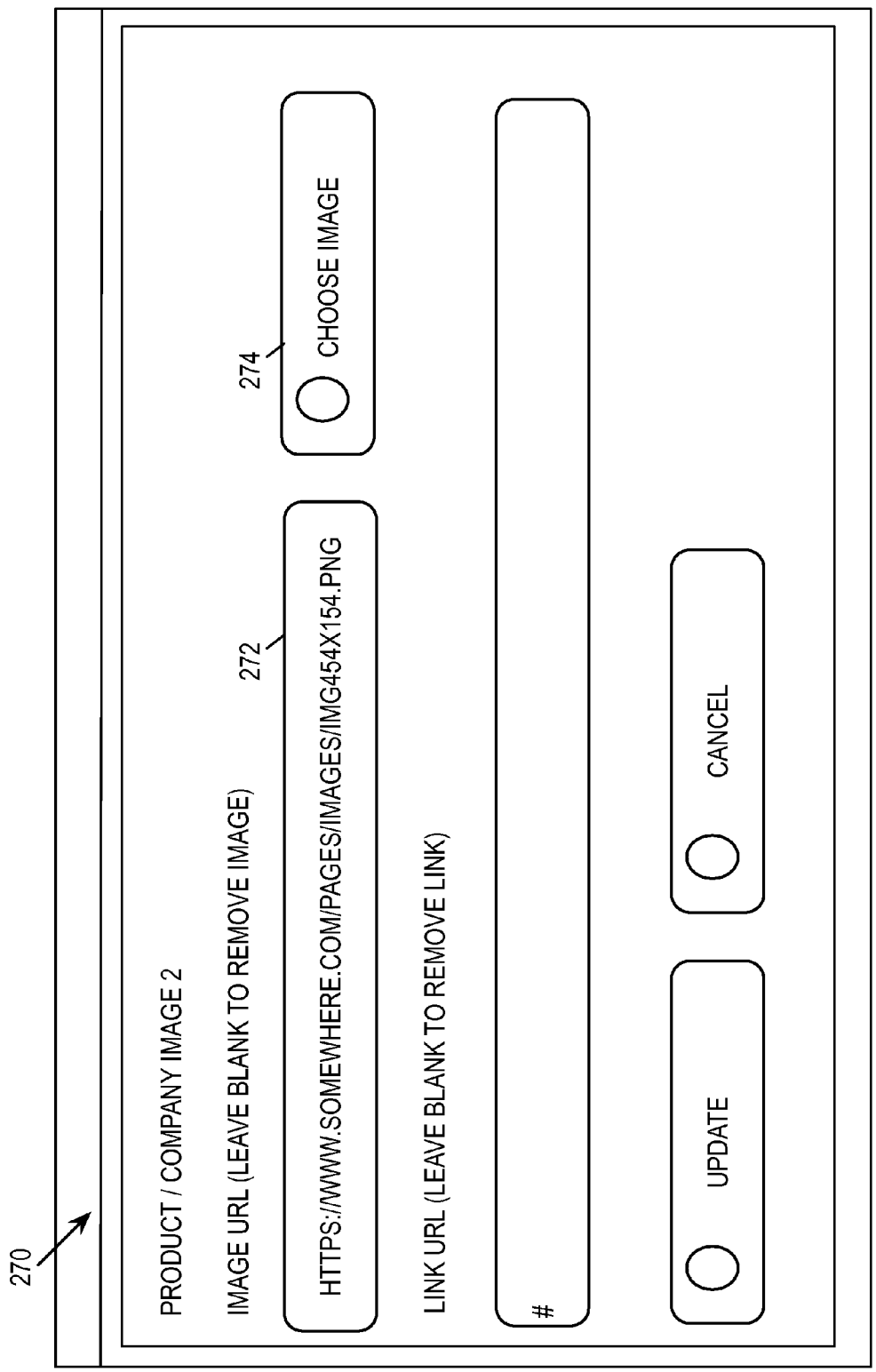
FIG. 12 is a simulated screen for one implementation that illustrates specifying details for the custom graphic for the selected page template.

Turning now to FIG. 11, a simulated screen 264 for one implementation is shown that illustrates adding/editing a custom graphic for the selected page template, such as custom graphic section 256 of FIG. 10. When a particular section is selected, an edit region 266 is displayed to indicate that the section has been selected for editing. Upon further clicking on edit region 266, a another screen such as simulated screen 270 in FIG. 12 is displayed. The user can specify additional details about the custom graphic, such as a path 272 to where the image is located, or a choose image option 274 to allow the user to upload an image.

Figure 13:
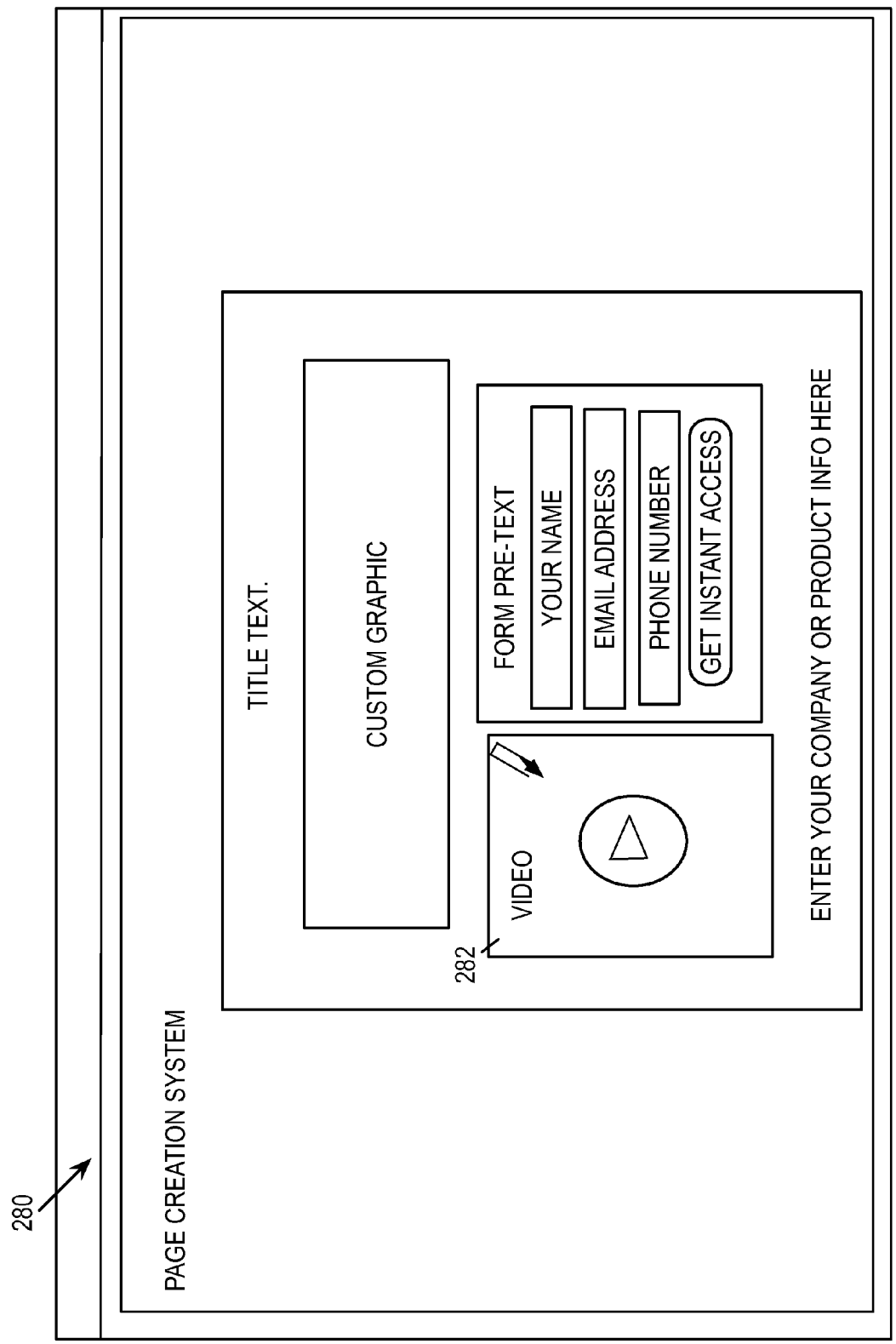
FIG. 13 is a simulated screen for one implementation that illustrates adding/editing a video for the selected page template.
Figure 14:
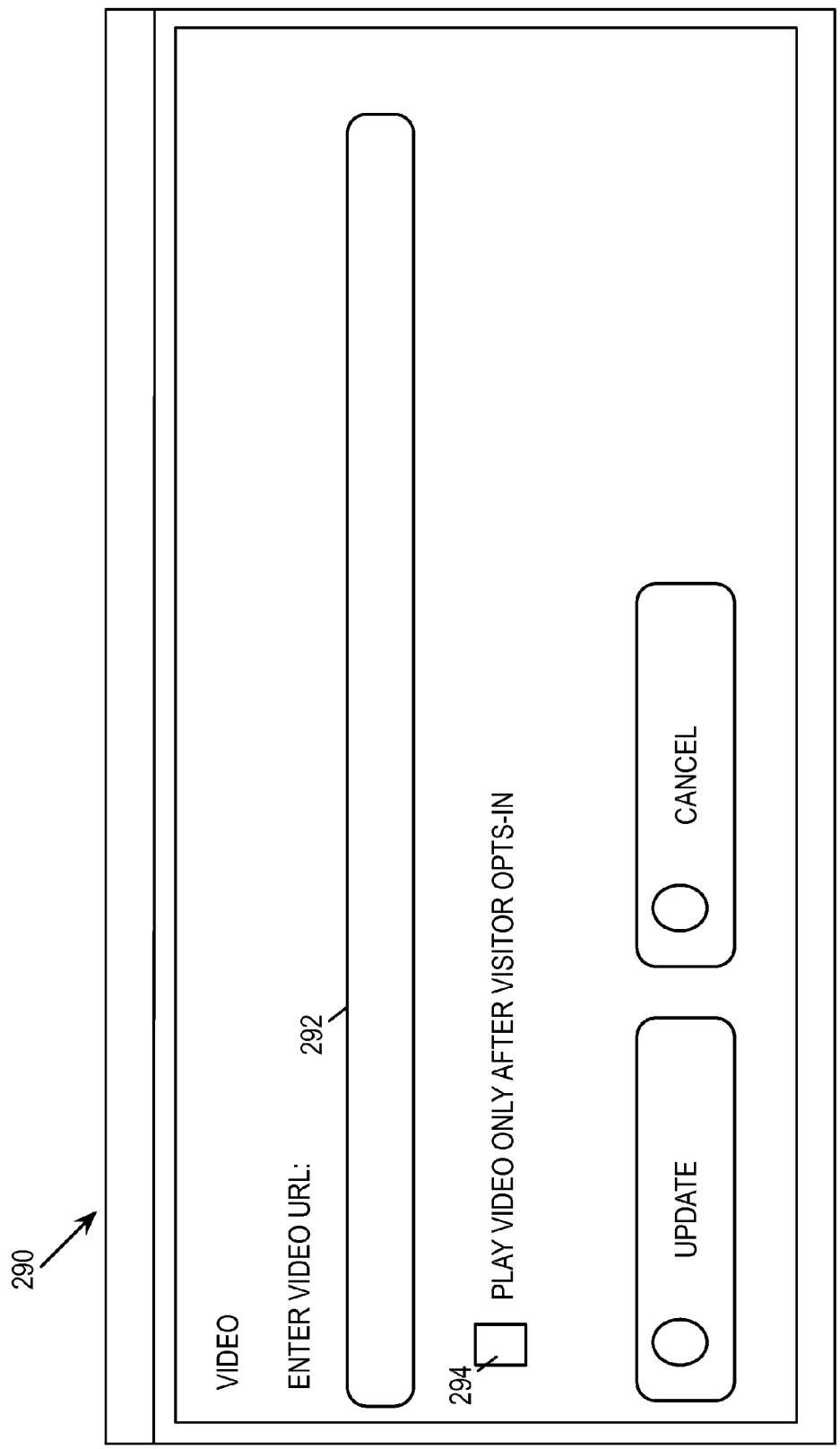
FIG. 14 is a simulated screen for one implementation that illustrates specifying details for the video for the selected page template.

Turning now to FIG. 13, a simulated screen 280 for one implementation is shown that illustrates adding/editing a video for the selected page template. Upon selecting the video region 282, another edit region is displayed. The user can then specify additional details about the video, such as shown in simulated screen 290 of FIG. 14. A video URL 292 can be specified, such as to a third party video site (e.g. YouTube, etc.) A play video option 294 can also be specified to indicate whether the video should only be played after the visitor opts in by providing the name, email, or other required opt-in information.

Figure 15:
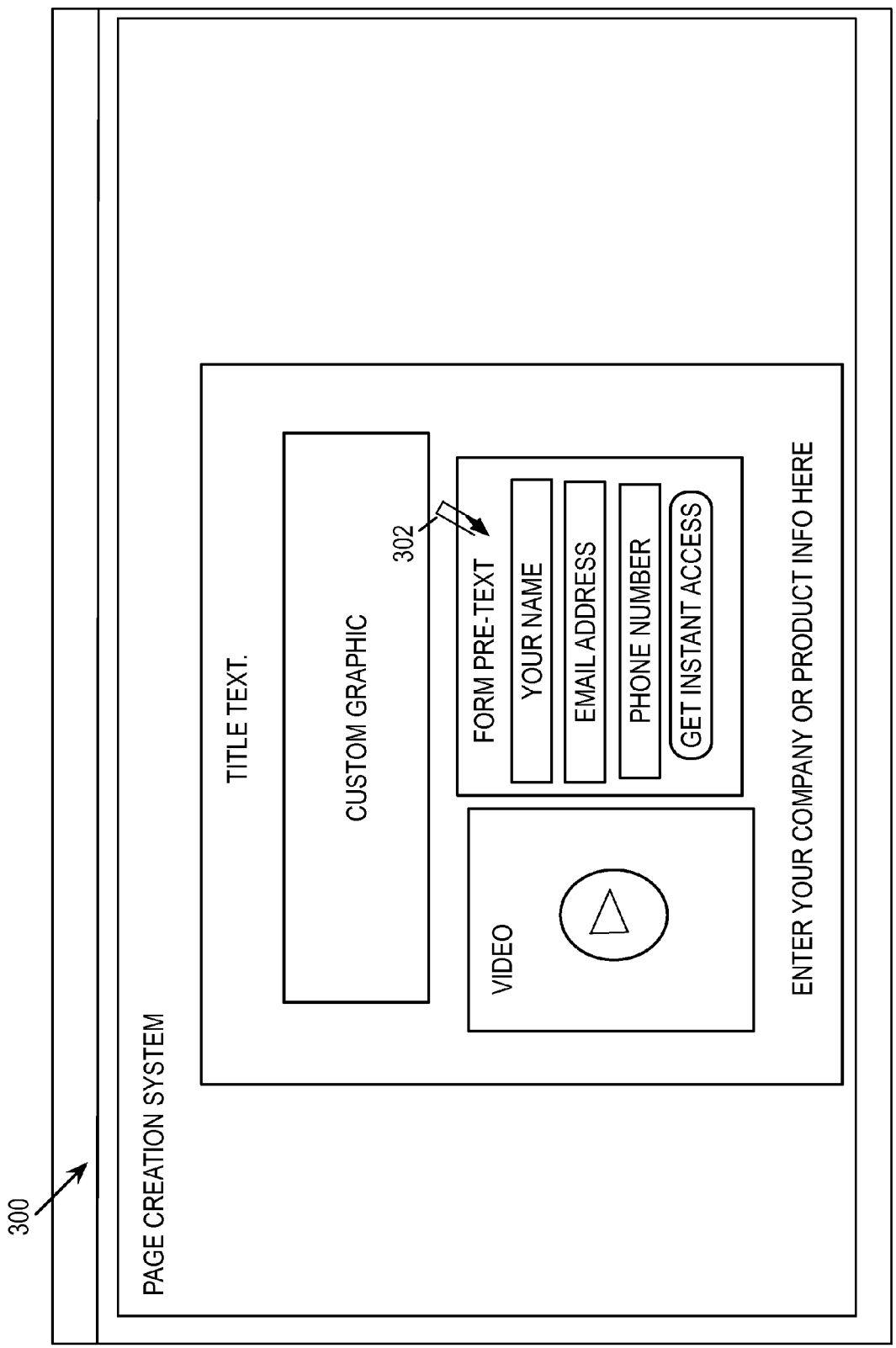
FIG. 15 is a simulated screen for one implementation that illustrates editing settings for a lead capture section for the selected page template.

Turning now to FIG. 15, is a simulated screen 300 for one implementation is shown that illustrates editing settings for a lead capture section 302 for the selected page template. In the example shown, the labels for the opt-in fields can be customized, such as to edit the form pre-text, and the name of the fields that the visitor will be asked to fill out.

Figure 16:
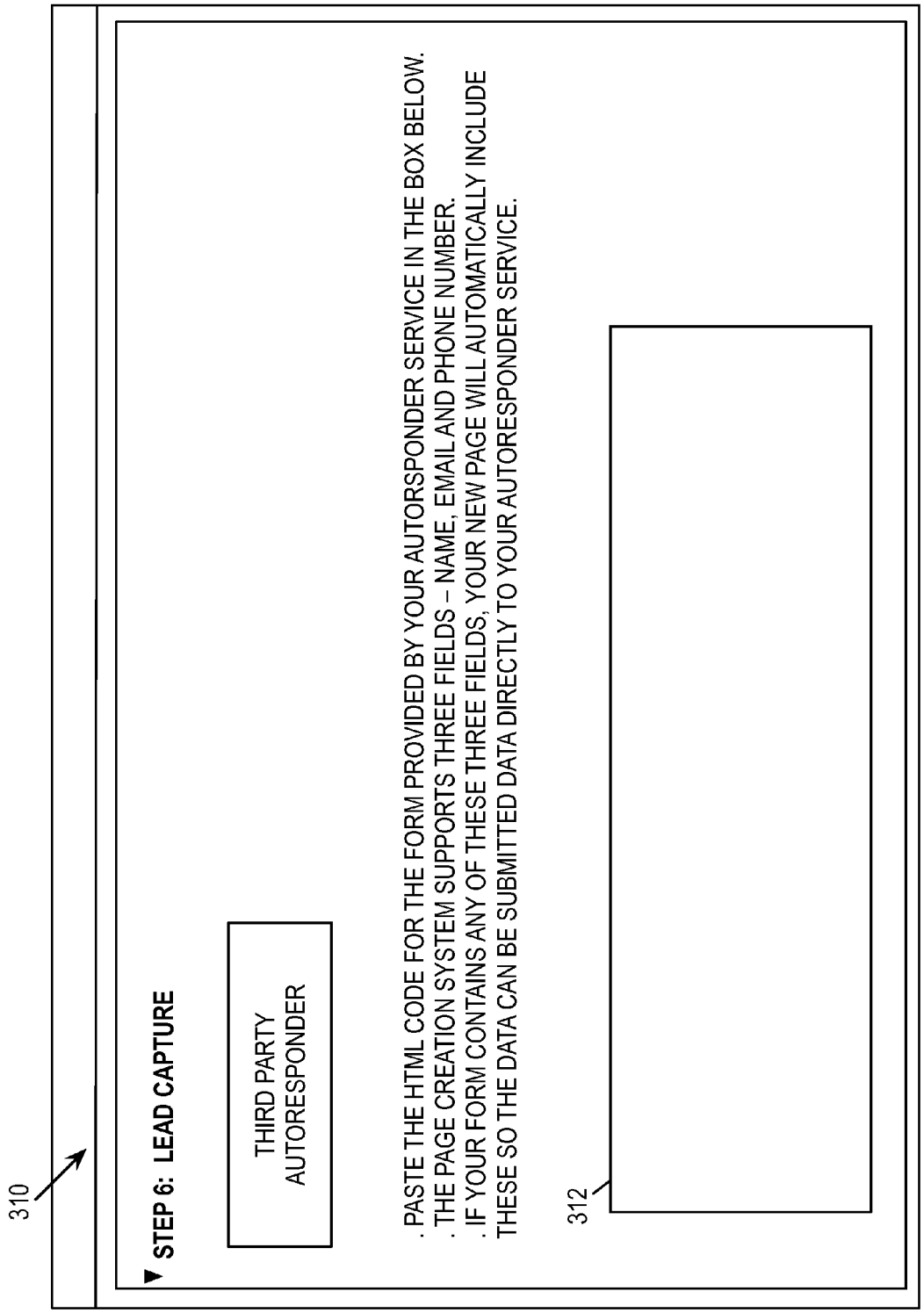
FIG. 16 is a simulated screen for one implementation that illustrates specifying lead capture details for an autoresponder system to integrate with the web page.

FIG. 16 is a simulated screen 310 for one implementation that illustrates specifying lead capture integration information 310 for an autoresponder system to integrate with the web page. In one implementation, lead capture integration information 310 includes HTML code from an autoresponder system that the user wants to have the leads submitted to when a visitor fills out the opt-in fields on the web page. In other implementations, a particular autoresponder system can be selected that page creation system 12 already integrates with, thereby saving the user from needing to specify any lead capture integration information 310 manually.

Figure 17:
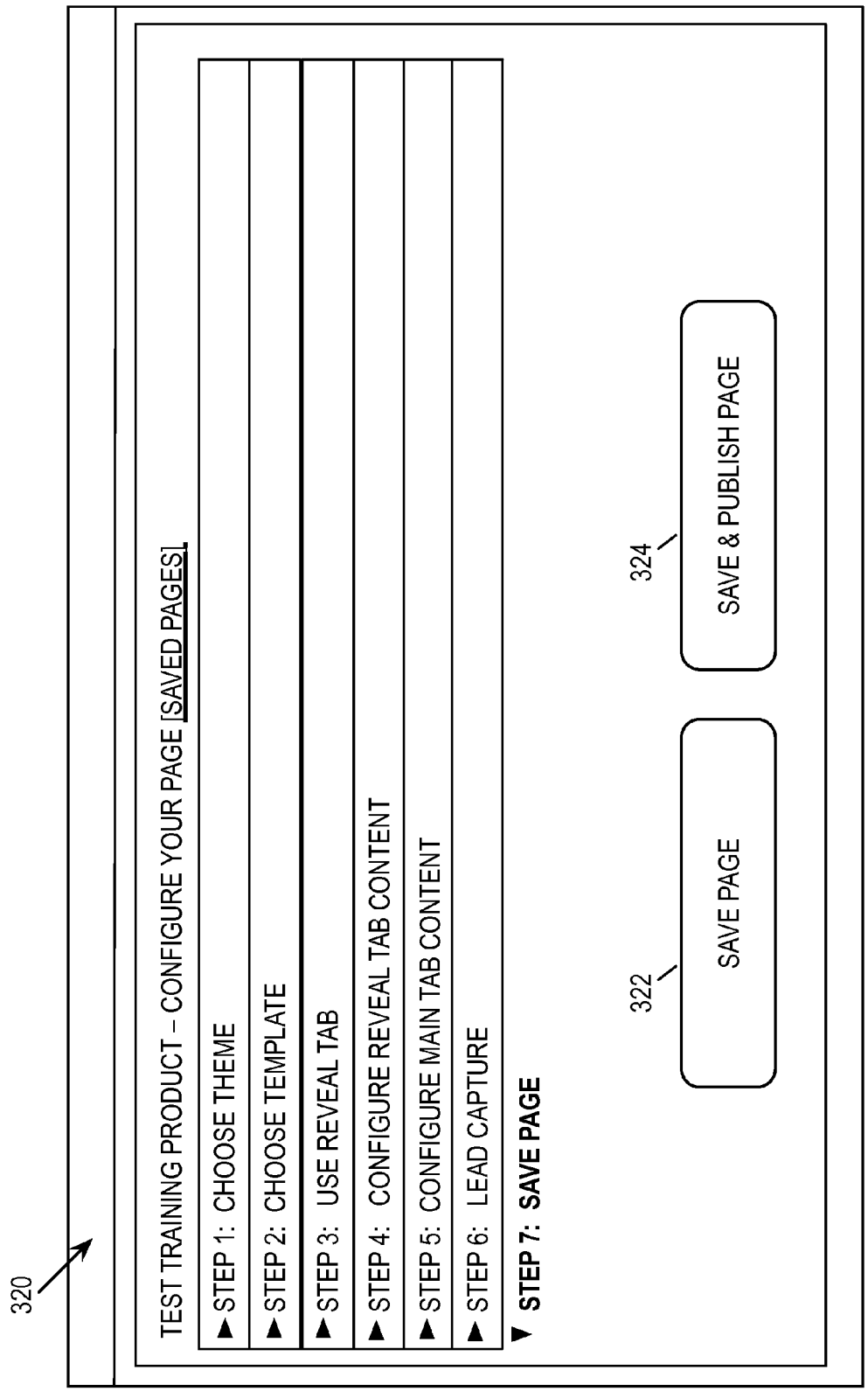
FIGS. 17-18 are simulated screens for one implementation that illustrate saving the customizations that have been made so far for the web page.
Figure 18:
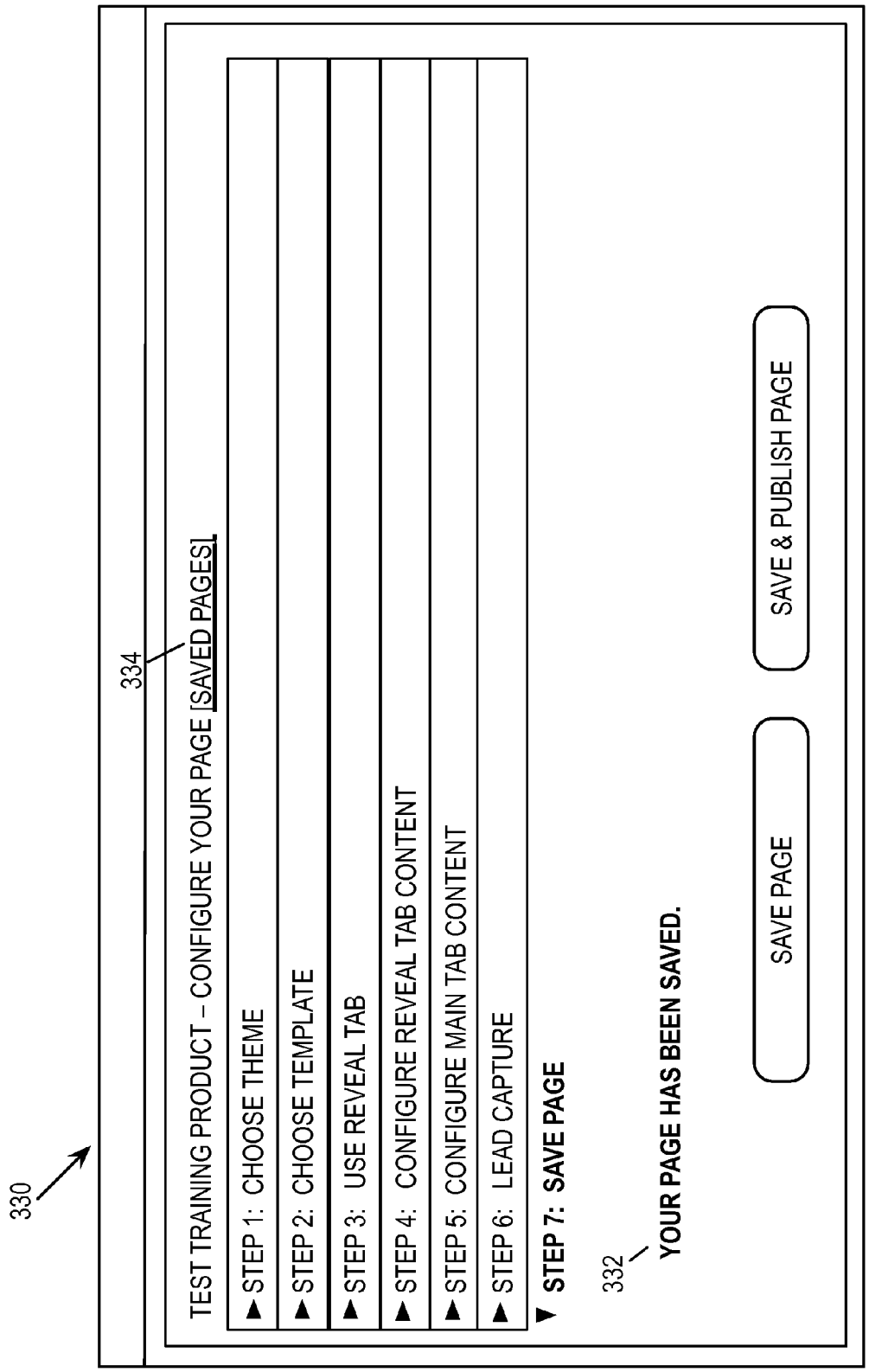
Figure 19:
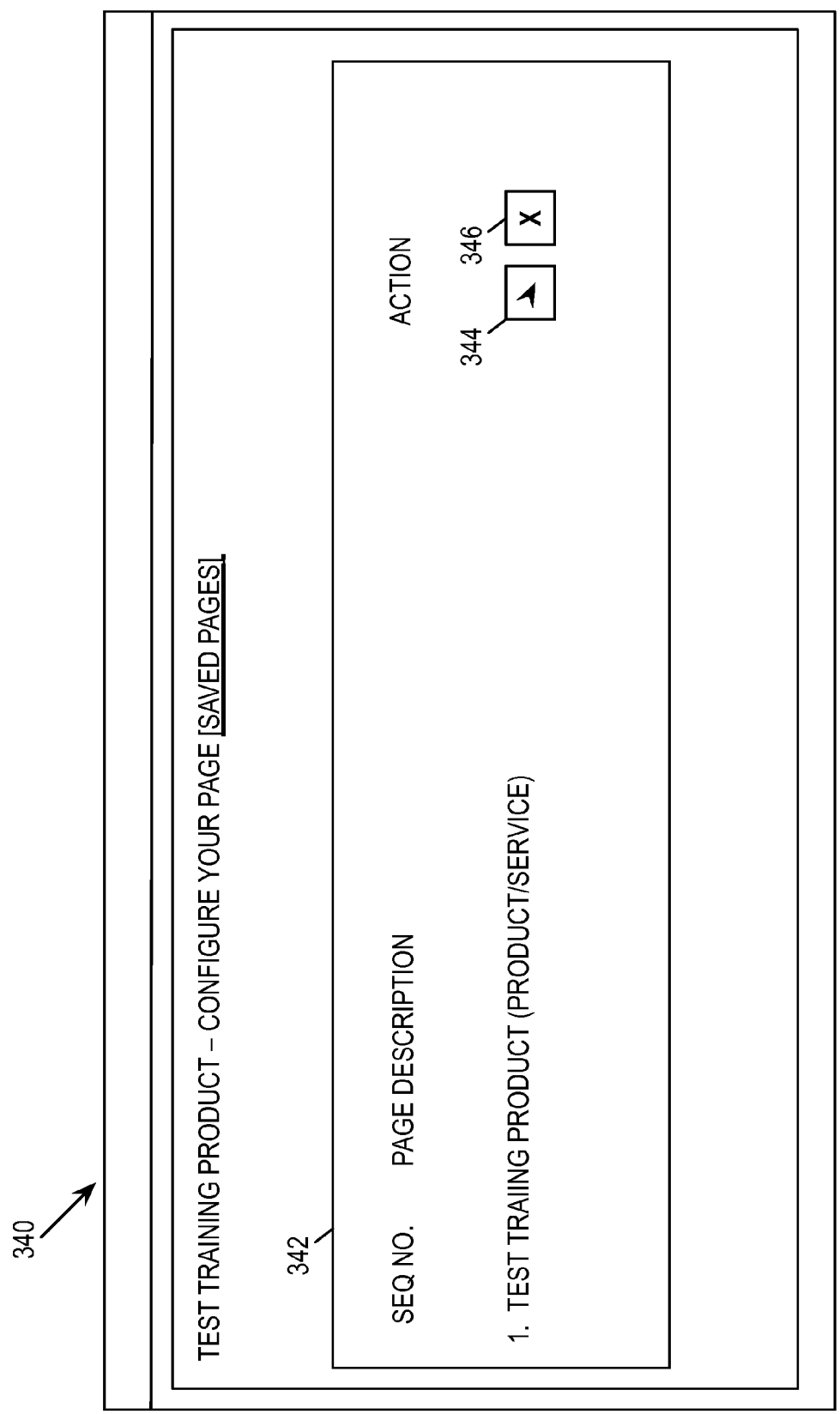
FIG. 19 is a simulated screen for one implementation that illustrates a list of saved pages that can be further edited or deleted.

FIGS. 17-18 are simulated screens for one implementation that illustrate saving the customizations that have been made so far for the web page. Simulated screen 320 of FIG. 17 shows a save page option 322 and a save and publish page option 324. Upon selecting the save page option 322, a confirmation message such as 332 on the simulated screen of FIG. 18 can be displayed. When the user selects an option 334 to view saved pages, as screen such as simulated screen 330 of FIG. 19 can be displayed. Screen 330 displays a list 342 of saved pages that can be further edited 344 or deleted 346, such as the test page that was just saved in the prior examples.

Figure 20:
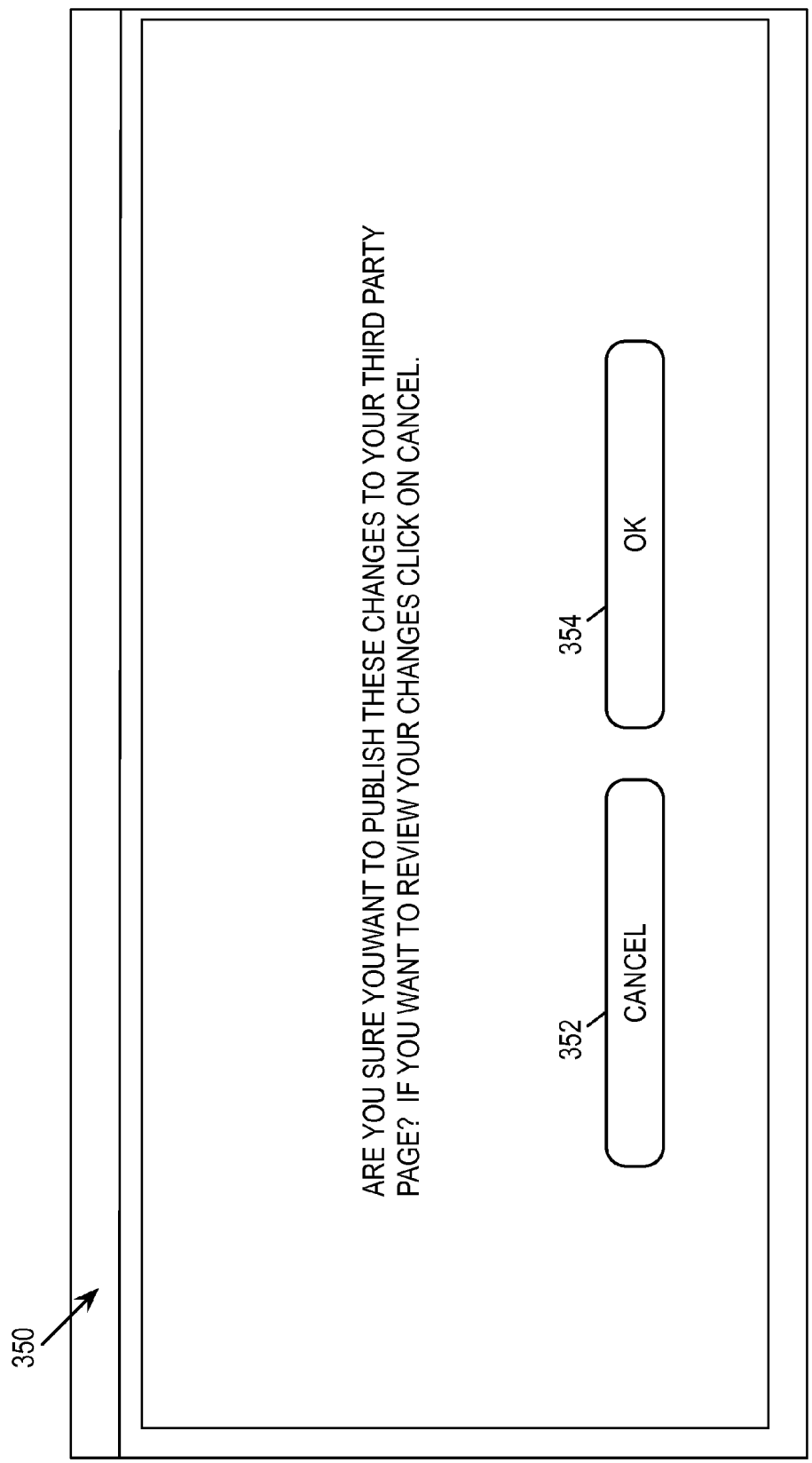
FIGS. 20-21 are simulated screens for one implementation that illustrates publishing the web page to the third party site.
Figure 21:
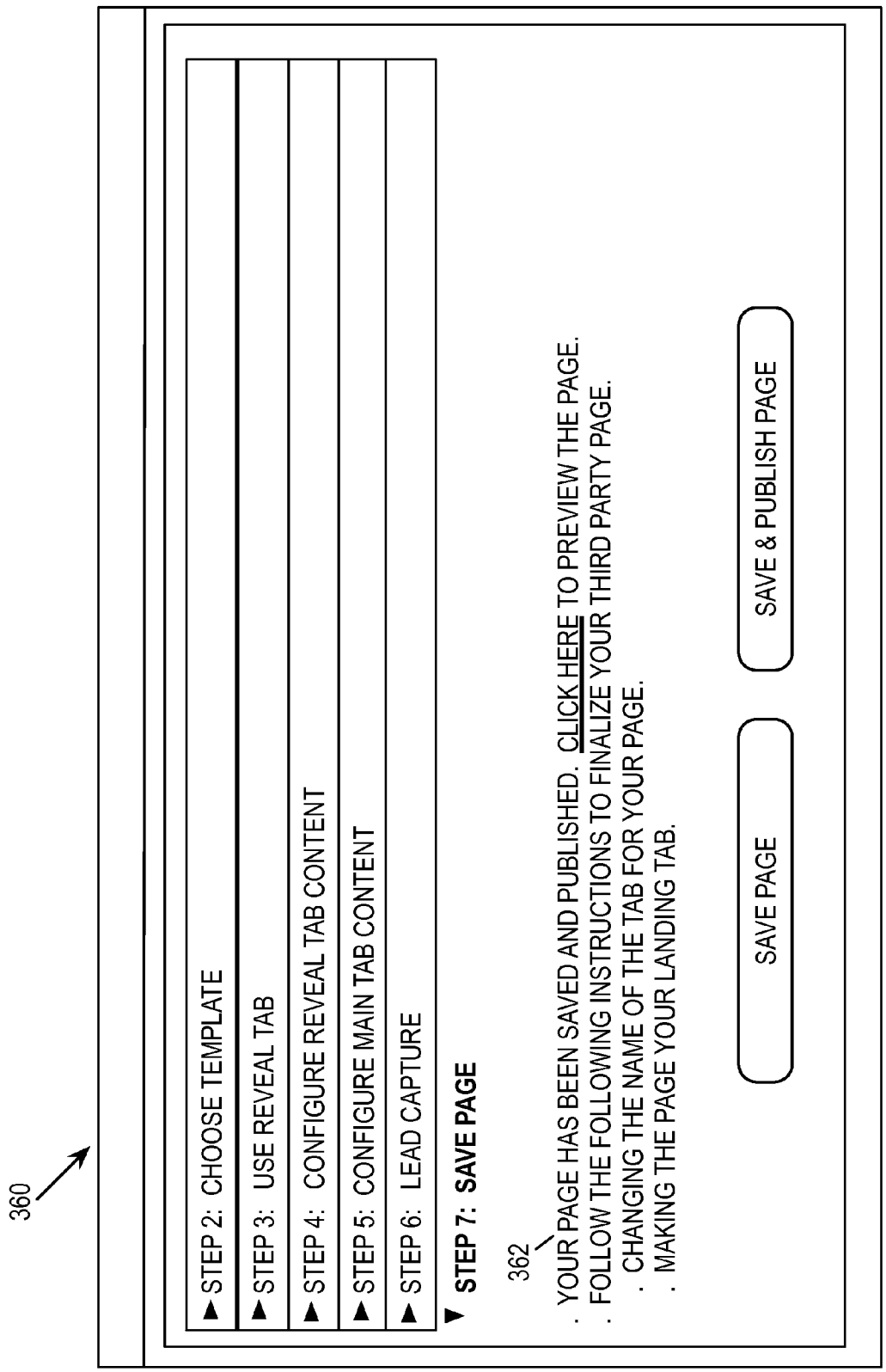

Returning back to FIG. 17, upon selecting the save and publish page option 324, a screen such as simulated screen 350 of FIG. 20 is then displayed to get user confirmation that the page is ready for publication. The user can then select a cancel option 352 if the user isn't ready for the page to be published on the third party web site, or the user can select the OK option 354 if the user is ready for the page to be published to the third party site. In one implementation, upon receiving the user selection of OK option 354, the web page(s) are created/updated (e.g. just the normal version if the reveal tab option is not being used, or the blurred version and the normal version if the reveal tab option is being used), and then published to the third party site (such as Facebook). Once the publication is finished, a screen such as simulated screen 360 of FIG. 21 is displayed to provide a confirmation message 362.

Figure 22:
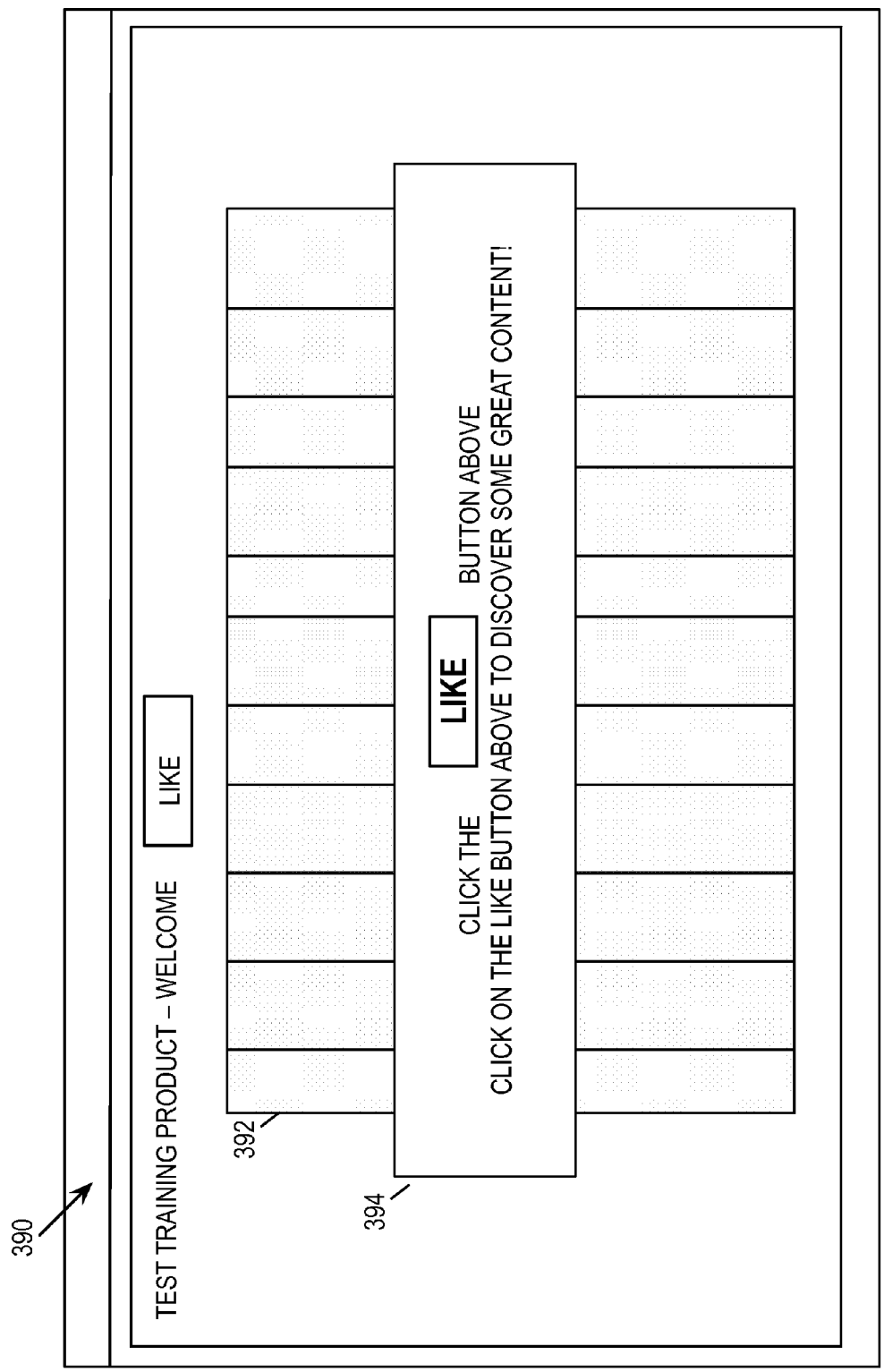
FIG. 22 is a simulated screen for one implementation that illustrates a blurred version of the web page being displayed as a reveal tab on the third party site.

FIG. 22 is a simulated screen 390 for one implementation that illustrates a blurred version of the web page 392 being displayed as a reveal tab on the third party site (such as on the user's Facebook page). In the example shown, a textual overlay message that is fully legible is displayed on top of the blurred image. The textual overlay message encourages a visitor of the third party web site to "like" the blurred version of the web page in order to see the normal version of the web page. In other implementations, a textual overlay message may be omitted, and just the blurred image displayed.

Figure 23:
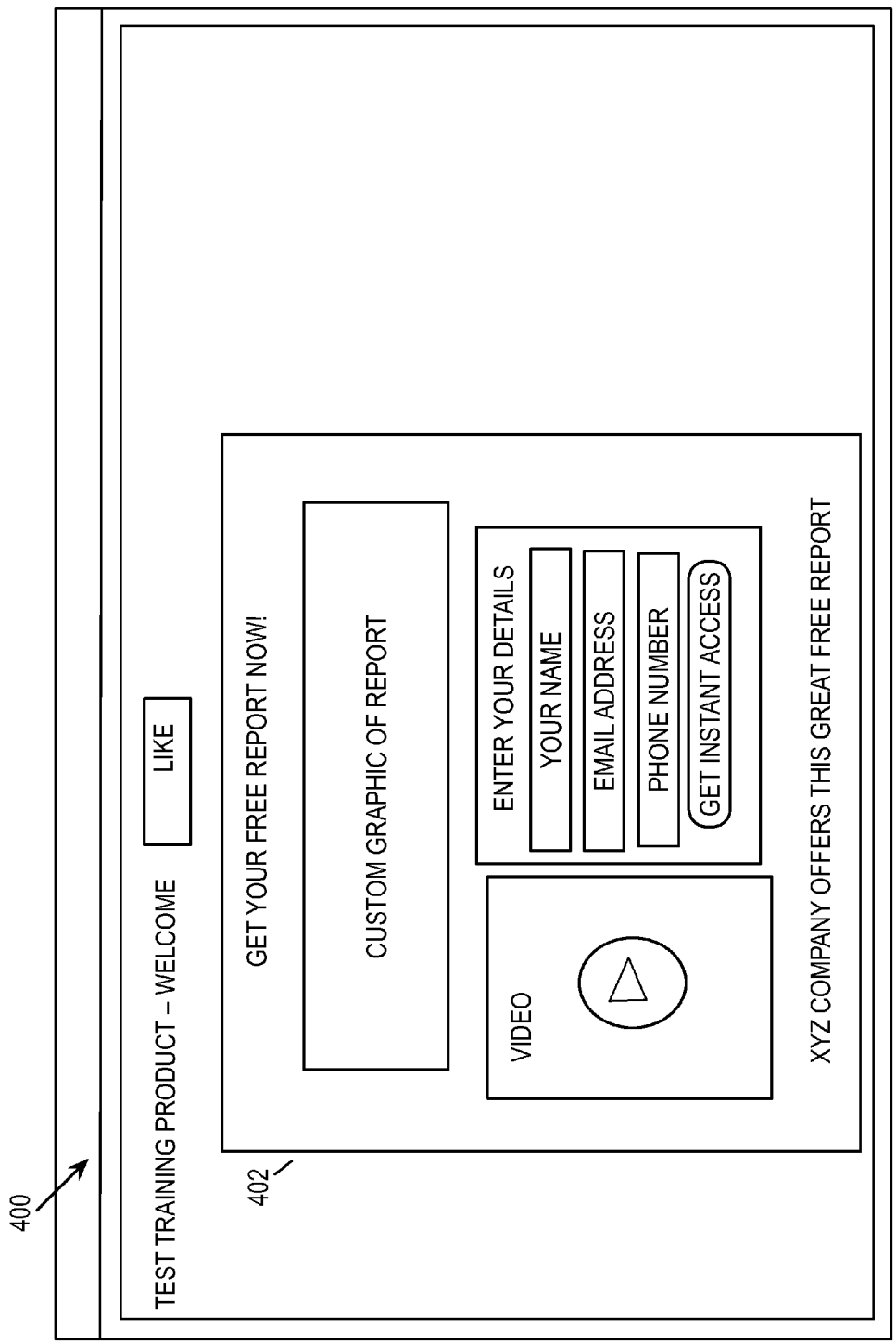
FIG. 23 is a simulated screen for one implementation that illustrates a normal version of the web page being displayed.

FIG. 23 is a simulated screen 400 for one implementation that illustrates a normal version of the web page 402 being displayed on the third party web site (such as Facebook). The normal version of the web page 402 may be displayed because the visitor selected the "Like" button (or equivalent option) on the third party site to indicate they liked the page. Alternatively or additionally, the normal version of the web page 402 may be displayed because the user is not using a reveal tab option, or such an option is not available on the third party site.

Figure 24:
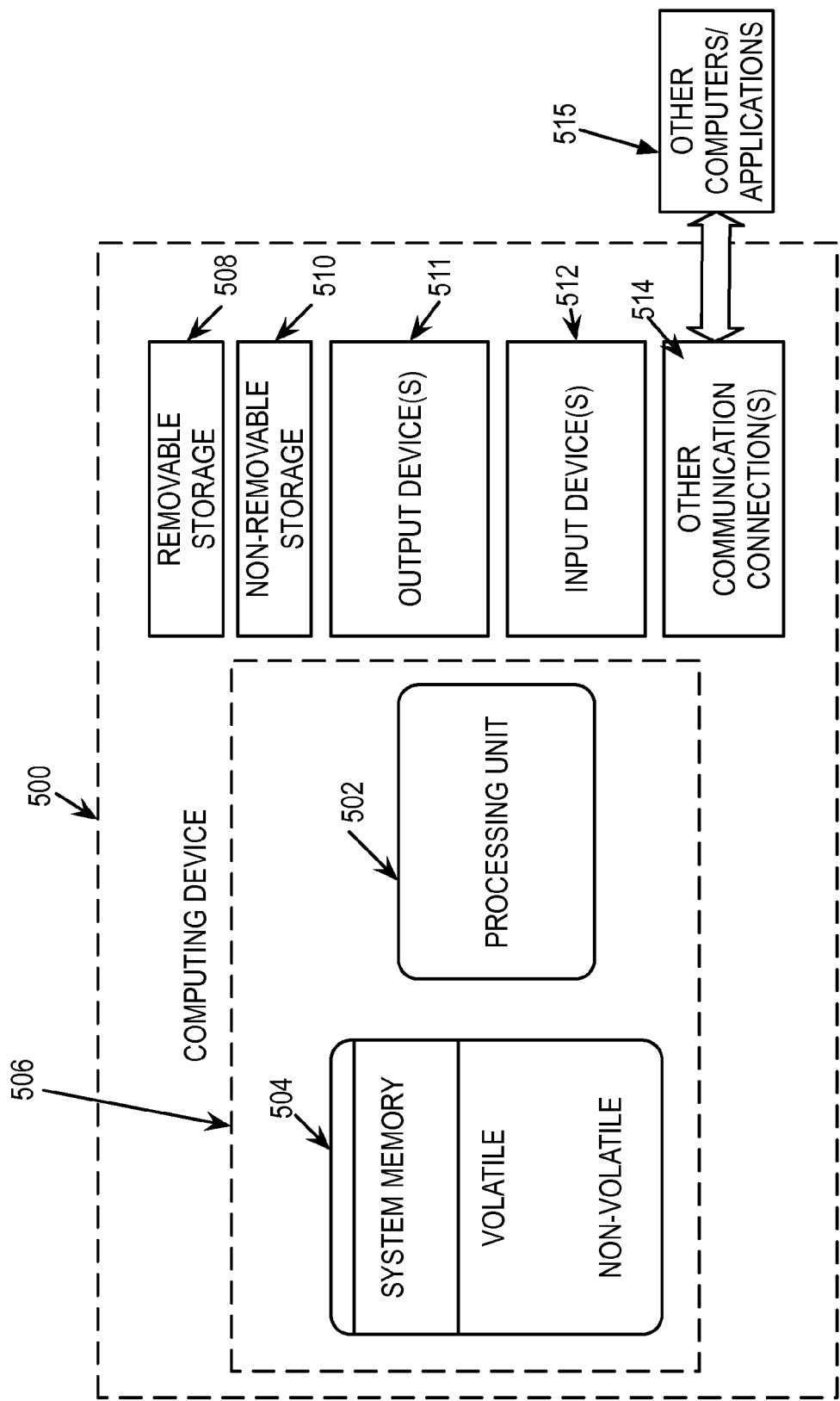
FIG. 24 is a diagrammatic view of a computer system of one implementation.

As shown in FIG. 24, an exemplary computer system to use for implementing one or more parts of the system includes a computing device, such as computing device 500. In its most basic configuration, computing device 500 typically includes at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 24 by dashed line 506.

Additionally, device 500 may also have additional features/functionality. For example, device 500 may also include additional storage (removable and/or non-removable) including, but not limited to, magnetic or optical disks or tape. Such additional storage is illustrated in FIG. 24 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Any such computer storage media may be part of device 500.

Computing device 500 includes one or more communication connections 514 that allow computing device 500 to communicate with other computers/applications 515. Device 500 may also have input device(s) 512 such as keyboard, mouse, pen, voice input device, touch input device, etc. Output device(s) 511 such as a display, speakers, printer, etc. may also be included. These devices are well known in the art and need not be discussed at length here.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A page creation system, comprising:
a microprocessor coupled to a memory, wherein the microprocessor is programmed to create and update web pages that encourage visitors to like a particular web page on one or more third party web sites by:
receiving integration details regarding a third party web site from a user;
receiving a page template selection from the user;
displaying a page template to the user, with incomplete sections of the page template for the user to fill in;
receiving content from the user to fill in at least a portion of the incomplete sections of the page template to form a completed page content;
receiving lead capture integration information from the user;
receiving a create page selection from the user;
capturing an initial image of at least a portion of the completed page content; blurring at least a portion of the initial image to generate a blurred image;
creating a blurred version of a web page that includes at least a partially blurred image generated from the completed page content;
creating a normal version of the web page to be displayed after the blurred version, wherein the normal version of the web page is created with at least a portion of the lead capture integration information so that leads submitted through the normal version of the web page can be sent to an autoresponder system; and
publishing the blurred version and the normal version of the web page to the third party web site.

2. The page creation system of claim 1, wherein the normal version of the web page is designed to be displayed after a visitor on the third party web site selects an option to indicate that the visitor likes the blurred version of the web page.

3. The page creation system of claim 1, wherein the blurred version of the web page also includes a textual overlay message that is fully legible on top of the blurred image.

4. The page creation system of claim 3, wherein the textual overlay message encourages a visitor of the third party web site to like the blurred version of the web page in order to see the normal version of the web page.

5. The page creation system of claim 1, wherein the integration details are received after the user is redirected to login to the third party web site.

6. The page creation system of claim 1, wherein the integration details comprise a user name and password of the user for the third party web site.

7. The page creation system of claim 1, wherein at least a portion of the content received from the user for the incomplete sections is selected from the group consisting of text, video, and graphics.

8. The page creation system of claim 1, wherein the third party web site is Facebook.

9. A non-transitory machine-readable medium having stored thereon instructions for causing a page creation system to:
receive integration details regarding a third party web site from a user;
receive a page template selection from the user;
display a page template to the user, with incomplete sections of the page template for the user to fill in;
receive content from the user to fill in at least a portion of the incomplete sections of the page template to form a completed page content;
receive lead capture integration information from the user;
receive a create page selection from the user;
capture an initial image of at least a portion of the completed page content;
blur at least a portion of the initial image to generate a blurred image;

create a blurred version of a web page that includes at least a partially blurred image generated from the completed page content;

create a normal version of the web page to be displayed after the blurred version, wherein the normal version of the web page is created with at least a portion of the lead capture integration information so that leads submitted through the normal version of the web page can be sent to an autoresponder system; and publish the blurred version and the normal version of the web page to the third party web site.

10. The non-transitory machine-readable medium of claim 9, wherein the blurred version of the web page also includes a textual overlay message that is fully legible on top of the blurred image.

11. The non-transitory machine-readable medium of claim 10, wherein the textual overlay message encourages a visitor of the third party web site to like the blurred version of the web page in order to see the normal version of the web page.

12. The non-transitory machine-readable medium of claim 9, wherein the third party web site is Facebook.

\* \* \* \* \*